United States Patent
Chien

(10) Patent No.: US 10,859,221 B2
(45) Date of Patent: *Dec. 8, 2020

(54) LED PROJECTION NIGHT LIGHT

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/967,862

(22) Filed: Dec. 14, 2015

(65) Prior Publication Data

US 2016/0097499 A1    Apr. 7, 2016

Related U.S. Application Data

(60) Continuation of application No. 14/539,267, filed on Nov. 12, 2014, which is a division of application No.
(Continued)

(51) Int. Cl.
  *F21V 33/00*   (2006.01)
  *F21S 8/00*    (2006.01)
  (Continued)

(52) U.S. Cl.
  CPC .............. *F21S 8/035* (2013.01); *F21K 9/232* (2016.08); *F21S 10/007* (2013.01); *F21V 5/04* (2013.01);
  (Continued)

(58) Field of Classification Search
  CPC . F21V 5/04; F21V 21/08; F21V 21/14; F21V 21/22; F21V 17/02; F21V 33/0052; F21V 14/003; F21V 14/006; F21V 23/00; F21V 13/02; F21V 14/06; F21V 14/08; F21V 23/04; F21V 21/30; F21V 23/0442;
  (Continued)

(56) References Cited

U.S. PATENT DOCUMENTS 5,685,097 A * 11/1997 Marinov ................. G09F 19/08
                                                                   362/283
5,934,223 A *  8/1999 Ellery-Guy .......... A01K 15/025
                                                                   119/702
(Continued)

*Primary Examiner* — Y M. Quach Lee
(74) *Attorney, Agent, or Firm* — Bacon & Thomas, PLLC

(57) ABSTRACT

An LED projection night light for night time or dark area use includes a plug-in wall outlet night light or direct current operated night light with projection features to project an image, message, data, logo, or time on a ceiling, walls, floor, or other desired surface. The LED night light incorporates optics-lens and Object with preferred focus calculation to create bigger image to shown on locations. The parts for make night light including but not limited as an optics-lens, slides, openings, or cut-outs, and/or a transparent material piece, translucent material piece, telescope assembly, housing-member, slide-film, slide-disc, elastic-member, tilt-means, rotating-means, adjust-means, roller-means, mechanical-means, extend-means, convex lens, and/or concave lens designed to make the desired image, message, data, logo, or time project to the ceiling, walls, floor, or other desired surface to be seen by a viewer. The LED light upgrade model has an interchangeable power source arrangement, permitting the night light to be selectively powered by either an AC powered sealed-unit or a DC powered battery-pack.

11 Claims, 7 Drawing Sheets

Related U.S. Application Data

14/275,184, filed on May 12, 2014, which is a division of application No. 12/318,470, filed on Dec. 30, 2008, now abandoned, application No. 14/967,862, which is a continuation of application No. 11/806,286, filed on May 31, 2007, now abandoned.

(51) Int. Cl.

| | | |
|---|---|---|
| *F21V 29/00* | (2015.01) | |
| *F21V 21/14* | (2006.01) | |
| *F21V 21/22* | (2006.01) | |
| *F21K 9/232* | (2016.01) | |
| *F21V 17/02* | (2006.01) | |
| *F21V 14/00* | (2018.01) | |
| *F21S 10/00* | (2006.01) | |
| *F21V 14/08* | (2006.01) | |
| *F21V 5/04* | (2006.01) | |
| *F21V 13/02* | (2006.01) | |
| *F21V 23/00* | (2015.01) | |
| *F21V 21/30* | (2006.01) | |
| *F21V 23/04* | (2006.01) | |
| *F21W 121/00* | (2006.01) | |

(52) U.S. Cl.
CPC ............ *F21V 13/02* (2013.01); *F21V 14/003* (2013.01); *F21V 14/006* (2013.01); *F21V 14/08* (2013.01); *F21V 17/02* (2013.01); *F21V 21/14* (2013.01); *F21V 21/22* (2013.01); *F21V 23/00* (2013.01); *F21V 29/00* (2013.01); *F21V 21/30* (2013.01); *F21V 23/0471* (2013.01); *F21W 2121/00* (2013.01); *Y10S 362/80* (2013.01); *Y10S 362/806* (2013.01)

(58) Field of Classification Search
CPC ...... F21V 23/0471; F21K 9/232; F21K 9/135; F21S 8/035; F21S 9/02; F21S 10/007; F21S 4/28; F21S 10/002; G02F 1/1313; G03B 21/2046; G03B 23/00
See application file for complete search history.

(56) References Cited

U.S. PATENT DOCUMENTS

| | | | |
|---|---|---|---|
| 6,350,042 B1* | 2/2002 | Lai | F21V 17/02 |
| | | | 362/293 |
| 8,721,160 B2* | 5/2014 | Chien | F21S 9/02 |
| | | | 362/280 |
| 2001/0007527 A1* | 7/2001 | Lammers et al. | F21S 6/002 |
| | | | 362/268 |

\* cited by examiner

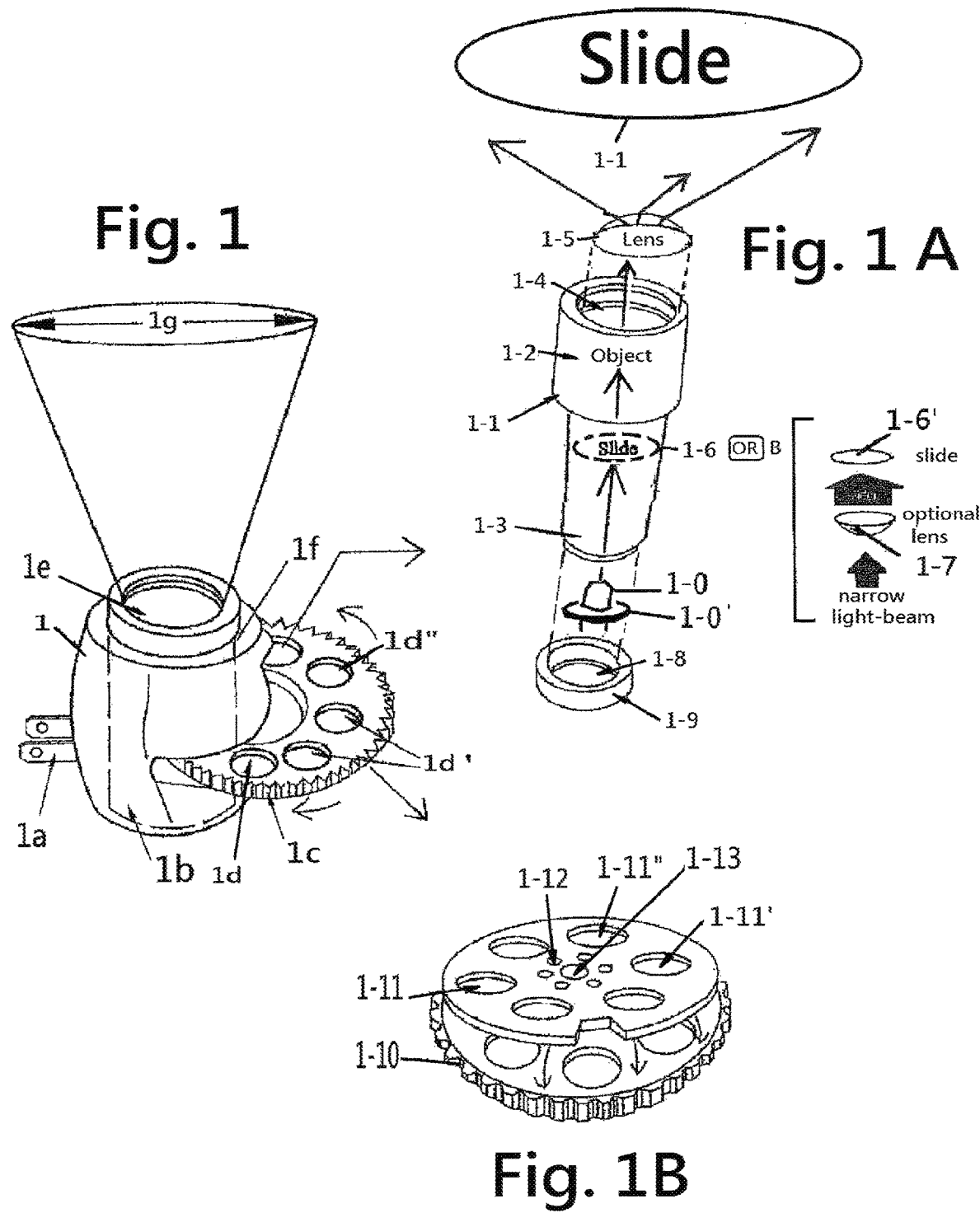

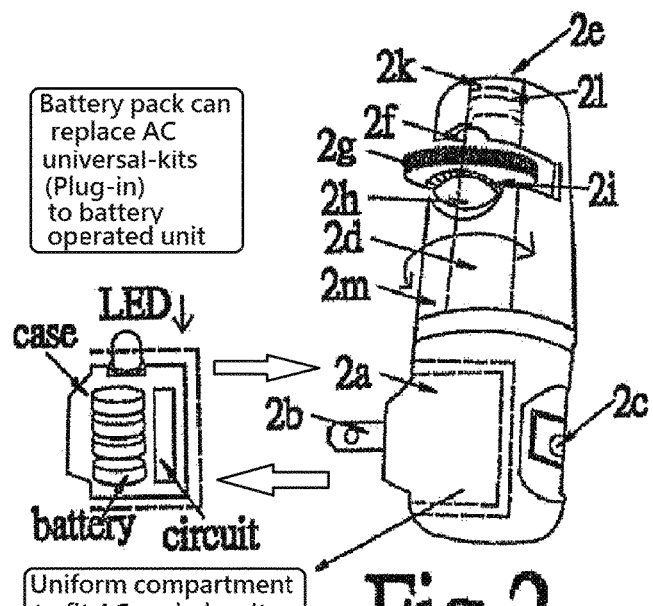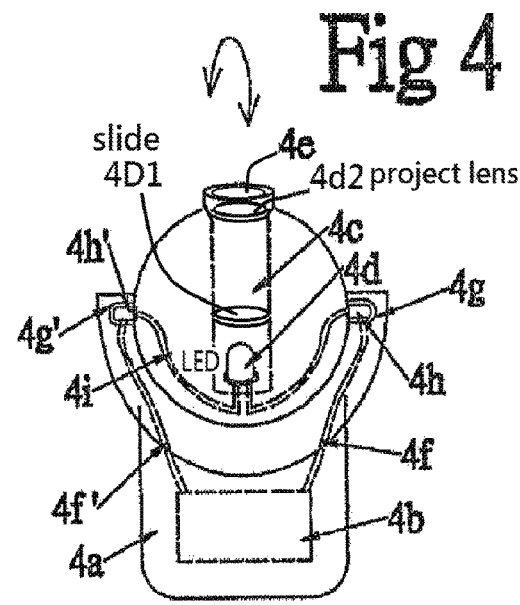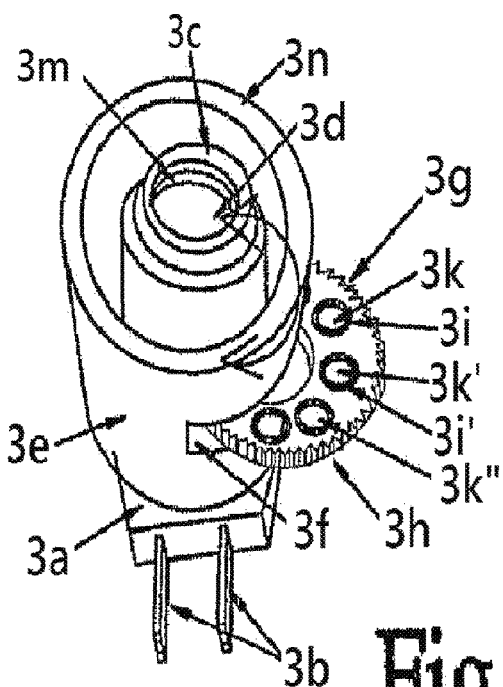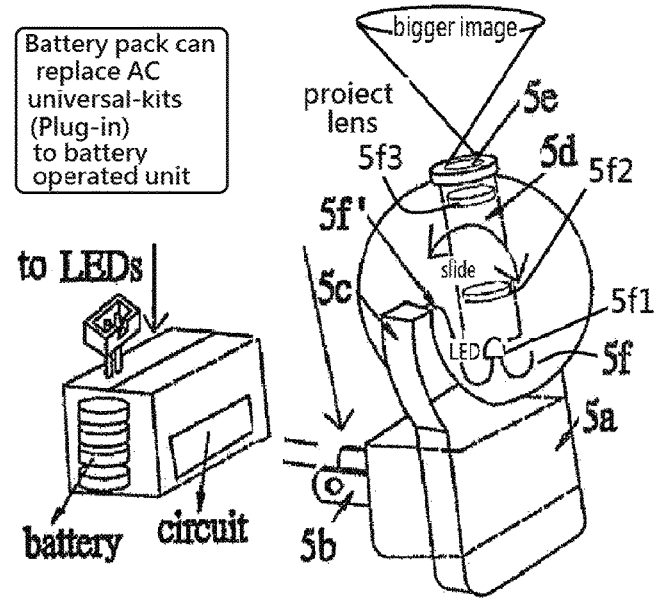

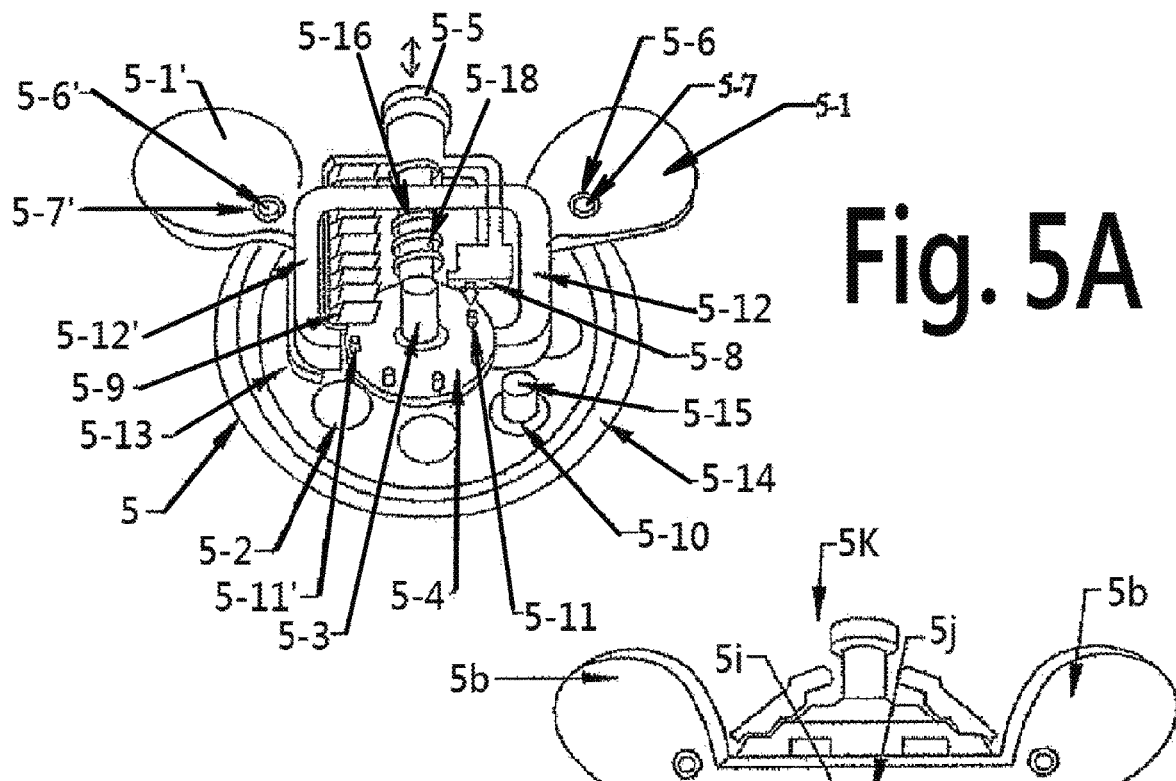
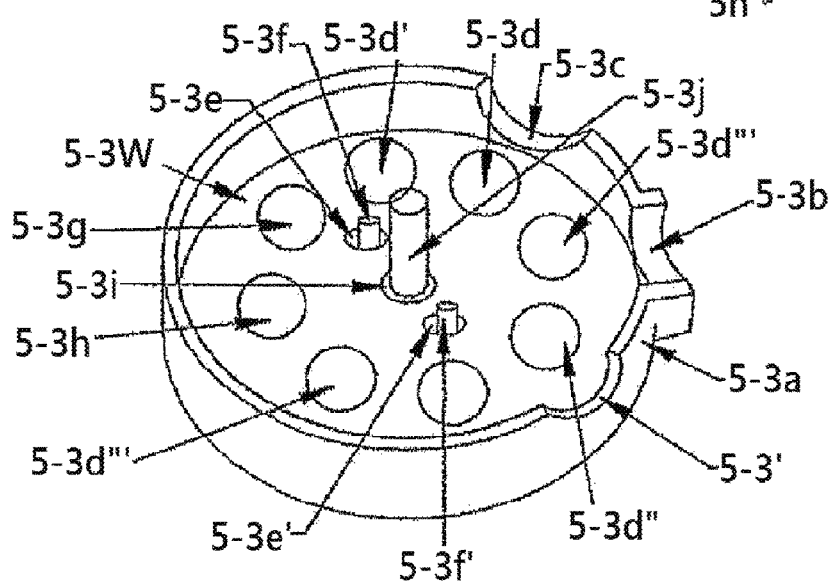

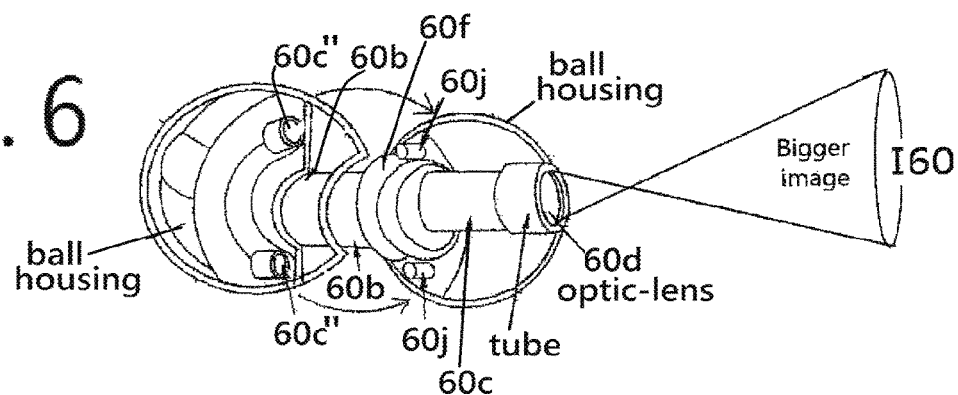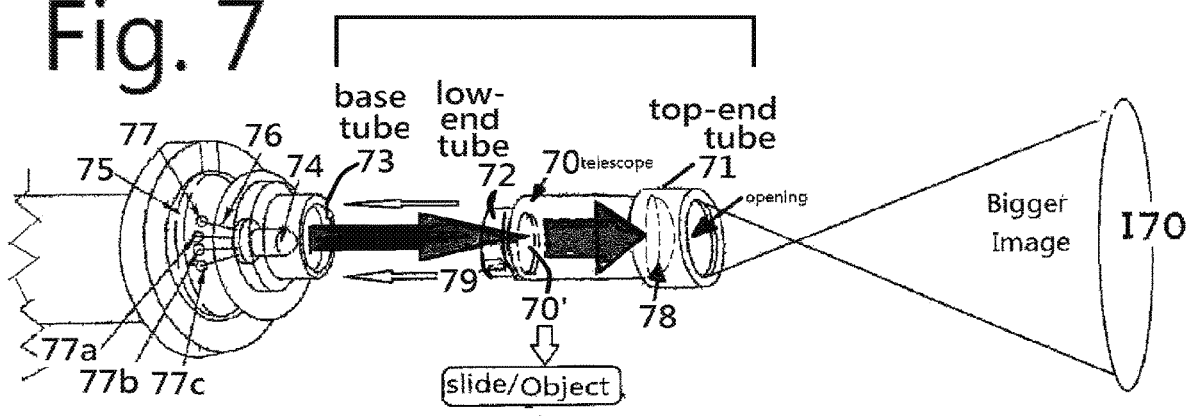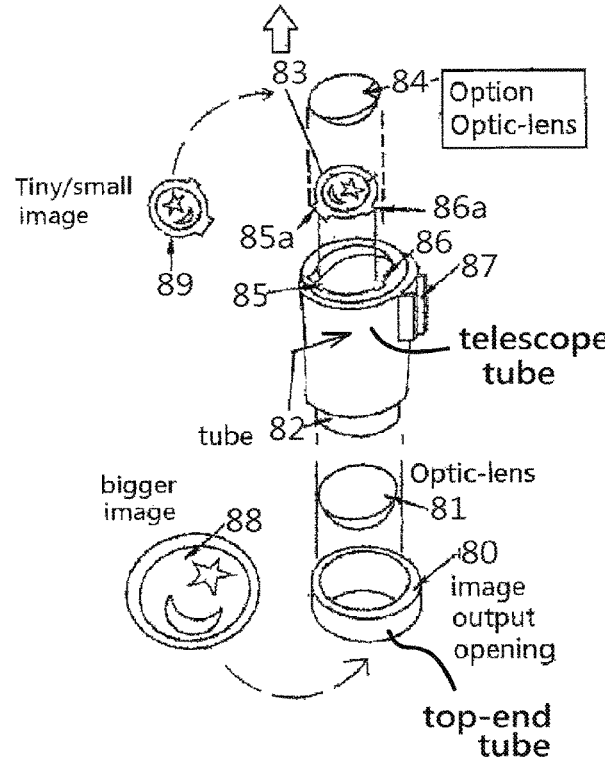

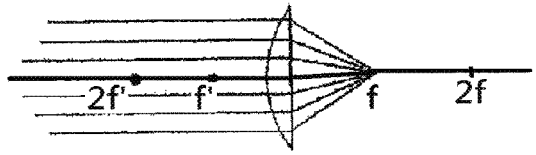

Fig 10

Base physic theory for lens focus

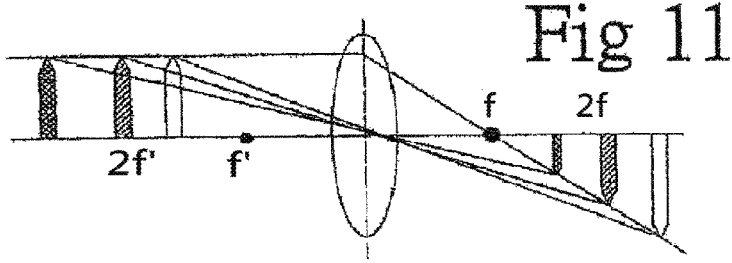

Fig 11

Basic Physic theory
Relation of Object VS. image VS. focus of lens.
1. Object on 2f' object has same size of image on 2f
2. Object between F' and 2f'==>
   image behind 2f with large reverse image.
3. Object away from 2f'=>
   the image will fall within 1f and 2f
   with smaller and reverse image.

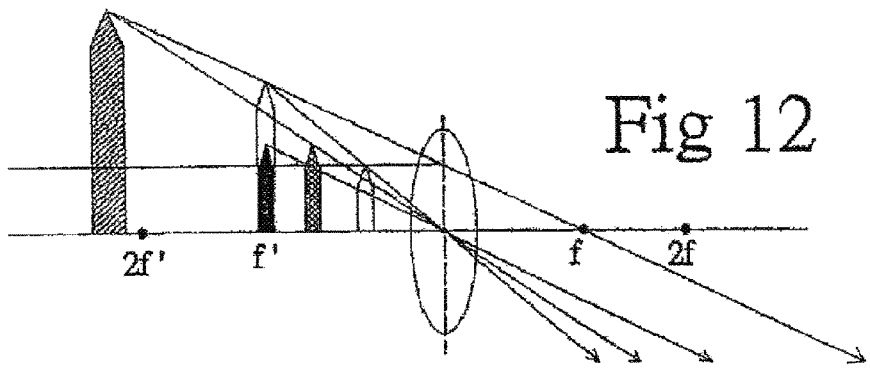

Fig 12

Object Location< f'
image located on the same side of the f. and Imag size
will become more smaller while the object more close the lens.

ABSTRACT
LED PROJECTION NIGHT LIGHT

This application is a continuation of U.S. patent application Ser. No. 14/539,267, filed Nov. 12, 2014, which is a divisional of U.S. patent application Ser. No. 14/275,184, filed May 12, 2014, which is a divisional of U.S. patent application Ser. No. 12/318,470, filed Dec. 30, 2008, each of which is incorporated herein by reference.

This application is a divisional of U.S. patent application Ser. No. 11/806,285, filed May 31, 2007, incorporated herein by reference.

This application has subject matter in common with that of U.S. patent application Ser. No. 12/292,153 ("LED night light has projection or image feature"), now U.S. Pat. No. 7,871,192; Ser. No. 12/318,470 ("LED night light with Projection features"), now U.S. Pat. No. 7,832,918); Ser. No. 12/149,963 ("Removable LED light device"), now U.S. Pat. No. 7,722,230); Ser. No. 12/073,889 ("LED track light device"), now U.S. Pat. No. 8,827,511); Ser. No. 12/073,095 ("LED light with changeable position with Preferable power source"), now U.S. Pat. No. 7,726,869); Ser. No. 12/007,076 ("LED light with changeable geometric system"), now U.S. Pat. No. 7,726,861); Ser. No. 12/003,691 ("LED light with changeable geometric dimension features"), now U.S. Pat. No. 7,726,839); Ser. No. 12/003,809 ("LED light with changeable features"), now U.S. Pat. No. 7,618,150; Ser. No. 11/806,711 ("Multiple LED light with adjustable angle features"); Ser. No. 11/527,631 ("LED Night light with interchangeable display unit"); Ser. No. 11/498,881 ("Poly Night light"); Ser. No. 11/255,981 ("Multiple light source Night Light"); ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 ("Time Piece with LED night light"); Ser. No. 11/806,284 ("LED Night light with more than one optics medium", now U.S. Pat. No. 7,632,004; Ser. No. 11/806,285 ("LED Night Light with multiple functions"); and Ser. No. 11/806,711 ("Multiple LEDs Light with adjustable angle function"), now U.S. Pat. No. 7,677,745).

BACKGROUND OF THE INVENTION

The current invention projects a colorful image on a wall or ceiling at a desired location to enable people to view an image such as character, logo, message, animals, logo, time, space shutter, stars, moon, planet, silver-river, or a universal image and cause the people to have a pleasant mood when in a dark environment, or to fall asleep in a nice environment. It is especially important for youth or kid's room applications to let the kids have their own favorite image surround them. It is also a great advertisement medium that not only promotes things but also offers a night light for illumination.

In a preferred embodiment, the current invention can take the form of a plug-in wall outlet LED night light having projection features to project the image, message, data, logo, and/or time on a ceiling, walls, or floor, or any other desired surface.

The night light of the current invention has as a light source an LED or LEDs, which may be the same as described in co-pending U.S. patent application Ser. No. 11/255,981, now U.S. Pat. No. 7,455,444, to provide a visible light beam that passes through an optics means or more than one optics means (as described in co-pending U.S. patent application Ser. No. 11/806,284, now U.S. Pat. No. 7,632,004, and creates an image at the desired location with desired characteristics selected from, for example, size, dimension, area, height, distance, color, brightness, time period, and trigger means. The current invention represents a big improvement over all U.S. prior art including the following U.S. patents:

U.S. Pat. No. 5,517,264 (Sutton) discloses a projection night light with a preferred seven watt bulb (408), which radiates too much heat so that a big distance from the bulb to the optics means is required. Because of the super high heat from the seven watt bulb, the night light requires use of a glass material, which is very big and dangerous to a user. Furthermore, the Sutton concept of using a glass reflection lens (604) to enable the image to be seen on the display screen (102) requires too complicated a construction and is not practical for a low cost application. In addition, the glass lens is much too fragile, and also is too heavy for the prongs to stay tightly in the outlet.

The Sutton device uses an object, such as a sticker or film, on a side-window to form an image of the object upon illumination by the bulb (408) so the image will be reflected by the glass reflection lens (604) into a tube and show on the top ceiling. This arrangement differs from that of the LED projection night light of the present invention in that:

(a) Sutton use reflection theory to form the top ceiling image. The current invention uses refraction theory to form the image.

(b) The different optics theories utilized by Sutton and current invention result m constructions that are totally different.

(c) Sutton uses a reflection lens (604), necessitating a relatively large slide and tube diameter, which also has to be big enough to load the tilted lens (604), whereas in the current invention the tube diameter can be almost the same as the LED diameter and therefore much smaller than Sutton's tube.

(d) Because, in the current invention, the tube diameter may be close to the LED diameter, one can use a small diameter object/slide and position it directly above the LED, which is a no-heat light source and will not melt or deform the plastic material of the object/slide/film.

(e) Also, because the slide can be relatively small, the cost is very low and the top optics-lens can also be a very small and expensive optic-lens to further save a lot of cost.

(f) The small tube, LED, slide, and optic-lens (four major parts) enables the cost drop to be big, and results in a compact size assembly that, when plugged-into a wall plug, can easily pass lab tests for pulling and weight to meet U.S. safety requirements as needed.

(g) The LED light beam of the current invention is emitted straight to the tiny image-forming object/slide/film. The resulting image is emitted straight to the top magnifying optics lens, which magnifies and emits a bigger image from the top opening of the housing. The path followed by all of the light beams is straight so that all LED light beams hit the slide and optics-lens perpendicularly. Thus, the Sutton arrangement is totally different in concept, physics theory, light traveling path, parts arrangement, cost, and construction, and is not comparable in any aspect.

Prior art U.S. Pat. No. 7,267,444 (Black, Jr.) discloses a projection night light which has the same problems as Sutton's, including use of too many lenses, including reflector mirror (303), condensing lens (105) (405), adjusting lens (106) (406), and grating lens (403), which grating lens corresponds to the one disclosed in the inventor's U.S. Pat. No. 5,667,736), and projection/object lens (415). Some of these lenses need to made of a glass material which is very fragile and will be broken because it is too heavy to hold tightly in an outlet. The Black patent also emphasizes that the night light disclosed therein projects an image onto a surface parallel to a path of the light beam, through the use of projection means on top of the night light's wall. This is the reason why Black needs a lot of special optics lenses and slides (109) (209) (309) (409) between the glass lens. The major differences between Black's arrangement and the current invention are as follows:

(1) Black discusses a toy or other hand-held device which has both a slide projector and an overhead projector, in which the projected image can be easily focused because the distance from the objective lens to the surface is substantially similar for the entire projected image. As described by Black, a slide projector normally comprises a light source (101) that projects light towards a slide (109) that includes a representation of an image. The light source (101) may have a reflective mirror (not shown) to reflect scattered light back towards the slide, and a lens 105 may be interposed between the light source (101) and the slide (109) to further concentrate light onto the slide. While a condenser lens is shown, a no-sphere (plano-convex) lens could also be used for this purpose. The light beam then passes through a projection/objective lens (115) that magnifies the image and projects it for display onto a surface (120), like a screen or wall. A field lens (not shown) could also be provided that further focuses the entire light beam passing through the slide (109) onto the objective lens (115). The light source (101), slide (105), and objective lens (115) are aligned along a common axis of light, which is why, in both the slide projector and the overhead projector, the distance from the objective lens to the surface is substantially similar for the entire projected image and the entire projected image can be at a substantially similar distance from a focal point of the objective lens.

A reason that the device of Black requires too many optics-means including (1) a reflective mirror (not shown), lens (105), a condenser lens or plano-convex lens, a projection/object lens (115), and a field lens (not shown), is that the light source has radiant light beams and needs a reflective mirror (not shown) to help collect all the backward light beams and emit them to front areas. In contrast, the current invention requires a maximum of only two lenses. The image size projected by Black's device is equal to the distance from the optic-lens to the projection surface(es) so this is suitable only as a toy or hand-held device. In the current invention, an image that is 12 feet away from the optic-lens is not 12 feet across even though it may be enlarged to, for example, two feet across.

(2) Another major difference with respect to the light device of Black is that in Black's design, the projected image is parallel with the light beam traveling path. Black use a Fresnel lens 313 to change the direction of light and focus it towards the projection/objective lens 315. The objective lens 315 has a surface, which may be asymmetrical, and can be at an angle of about zero (0) degrees to about twenty (20) degrees, with an angle of about ten (10) degrees being shown. Ideally, the Fresnel lens 313 is disposed at substantially the same angle as the objective lens 315. Light then passes through the objective lens 315, where the image is projected onto the substantially parallel surface. The current invention has no such device to change the light traveling direction, so that the light beams can strike the slide and optic-lens to magnify the image from tiny to bigger-size at an angle that is perpendicular to the slide and optic-lens. Further, the current invention has a movable housing that can be manipulated by a finger to change the bigger-size image's location, position, orientation at any time.

In summary, major differences between Black's light device and that of the current invention include (2-1) use of a different optics theory involving reflection and a Fresnel lens rather than the simple convex lens of the invention, (2-2) a different light performance in that Black causes the light beam to turn directions rather than keeping all light beams straight forward, (2-3) Black and the invention uses a different number of optics-lenses, 30 and different functions, construction, cost, and light performance, (2-4) the image or the result of the concepts are different, and (2-5) Black fails to disclose a night light construction that allows images to be projected to anywhere with an housing adjustable means. Other prior art includes:

U.S. Pat. No. 6,824,296—Souze et al-Rotating lens with bulb.

U.S. Pat. No. 6,889,918—Yaniv-Projector is wearable and projects an image onto screen.

U.S. Pat. No. 7,329,035—Feliciano-Child night light to be held or worn.

U.S. Pat. No. 7,438,446—McCann-Projector inside a hinged top box,

None of these prior lighting arrangements can pass a USA safety standard because they will not pass weight and pulling tests, and therefore are not safe and not qualified at all.

1. The current invention preferably incorporates an LED light source with an object (image carrier) and optics-lens (magnify the small image to a bigger-size image) based on physics lens and focus theory to create a bigger image at desired locations and also incorporate other parts such as an optics-lens or concave lens, and/or a tube/tube assembly/telescope construction, openings, cut-outs, plastic parts including transparent or translucent pieces, and a housing-member in a rectangular or any geometric shape to create the preferred bigger-size image at the desired location to enable the viewer to see the image and also optionally offer illumination for a dark environment.
2. The current invention can also have a different construction which enables a person to change the slides by a roller or push button or automatic changing device, or other mechanical means. This will enable one night light to exhibit a plurality of different images that can be selected for projection to the desired location
3. The current invention also may utilize an adjust-means to adjust the optics-means at any time and change the position of the image to any desired location by a tilt, rotating, or swivel mechanism, or another adjustment-facilitating construction, by finger force to make the bigger-size image change locations. For a desktop DC powered unit one can simply move the unit to change the image location, which may also be inside the scope of changing image location.
4. The current invention may also enable a focus of the image to be adjusted by providing an extend-means that causes a housing-member or tube/tube assembly/telescope unit to extend to change the inside lens' position relative to the object and change the position of a slide, light source, and/or lens.
5. The current invention may furthermore use a very simple tube/tube assembly/telescope construction to enable a projection-means including an object (image carrier) and/or optics-lens (which magnifies the small image to a bigger-size image) to be easily assembled within the tube/tube assembly/telescope and be incorporated with parts as discussed above into a related housing-member to become a finished LED projection night light.
6. The current invention utilizes physics or optics lens theory to cause the projected image to have a desired size, clearance, details, brightness, or other image specification.
7. In addition, the current invention may use the "interchangeable power source described in several of the Inventor's co-pending cited U.S. patent applications. The interchangeable power source device encloses all electric components, including a prong, circuit, trigger means, and/or an LED or LED connector, and seals the electric components within the "sealed housing" to provide a safe AC power source to turn on and turn off the said LEDs. The "sealed-housing" also can be replaced by a battery-pack which has all electric components within, including batteries, circuitry, trigger means, and/or an LED or LED connector within to cause the night light to illuminate according to a pre-determined function, timing, duration, and/or effects. This interchangeable battery-pack and sealed-unit of the night light enables the "power source" to be changed from AC to DC or DC to AC. It is to be appreciated, however, that the current invention is not necessarily limited to just simple DC powered or AC powered products.
8. The current invention incorporates the LED light, which has a narrow light beam (around 30 degrees) so as to fit into a small diameter of a tube/tube assembly/telescope tube channel to prevent light beams from leaking out. Some preferred constructions that use the outside housing to prevent the light beam leakage still fall within the current invention scope.
9. The current invention preferably uses a small diameter tube/tube assembly/telescope tube which has a sliding fit so that the small diameter tube channel only need to have a small object (i.e., a small image carrier such as film, slide or changeable digital data display/screen) for cost saving. Because the current invention has a small diameter of telescope tube, the optics-lens that enlarges the object's tiny image to a bigger-size image can also be small and less expensive to save a big cost. For some application, the optics lens can fit on the lens-holder within one tube of the tube assembly and be movable along a screw-track, raised-track or groove piece to change the optic-lens in front of the object (image carrier) and change the focus.
10. The current invention incorporates the LED, object, optics-lens and telescope or tube or tube assembly in such a way that the LED light beams are emitted directly to the object and optics-lens along the tunnel or channel of the straight telescope or tube and the light beams are emitted perpendicularly to the slide and optics-lens.
11. The current invention incorporates an optics lens which has refraction properties so as to magnify a small object's carried image into a bigger-size image.
12. The current invention a non-heat generating LED light source that can be put under or after the object, so that the object can be a plastic slide or plastic film and the non-heat LED will not damage the plastic slide or film as would be the case with a conventional incandescent bulb or other light source.
13. The telescope or tube is an elongate shaped device which may be in one piece or several pieces assembled together to securely install the object and optics at a desired location based on focus theory to get a desired bigger-size image.
14. The image-carrying object can be one of several types, including (1) a fixed image element, (2) several image-forming element in a holder means such as disk or roller, (3) a limited changeable digital data display such as a digital time display, (4) a changeable digital data in which the data is pre-stored inside a device, such as recorder, SD card, or digital storage device(s), (5) a changeable digital data display that gets data from wireless, Wi-Fi, the Internet, a website or from transmitted and received electric signals.
15. The night light has an adjustable construction to change the bigger-size image to any desired position, angle, locations, and orientation when people apply force to housing or parts of the night light. For a DC powered unit, the change in image location can be accomplished by just moving or changing the light position or orientation.
16. The night light can incorporate a straight telescope or tube having an LED on one side or end and other side or end having an optics-lens and image-forming object that fits within the telescope or tube to project the bigger-size image to a remote surface that is perpendicular to the LED light beam.
17. The LED light beams travel perpendicularly through the image-forming object, slide, or film, and the magnifying optics-lens to form the bigger-image.
18. The night light has more than one object(s), slide(s), film(s) arranged on a disc, holder or compartment device, which can be changeable and replaceable.
19. The night light includes at least one part incorporated with the LED for projecting the light through one of a plurality of different objects, slides or film to cause a desired image, message, data, logo, or time to be projected onto a ceiling, walls, floor, or other desired surface.
20. The night light can have means including a movable slide holding member for enabling manual or mechanical or automatic change from one of a plurality of slides to a different slide by moving the slide holding member from a first position in which one of a plurality of slides is in front of the LED to a second position in which a different slide is in front of the LED to change the image, message, data, logo, or time.
21. The night light has slides that are changeable or replaceable and changed by at least one of a roller, elastic member, and push button.
22. The slide may be mounted in a rotatable slide disc or compartment or holder which contains at least one or plurality of different slides.
23. The night light further can include at least one of the following elements: (a) a telescope or tube assembly, (b) tilt means for tilting, (c) rotating means for rotating, (d) adjust means for adjusting, (e) a roller, and (f) an elastic member to change a projection direction, focus or optics-lens of the night light.
24. The night light has a projection direction or focus or optics-lens that is changed by at least one of a rotating means, tilt means, swivel means, housing means, and bend means.
25. The night light may also include an extend means that changes a relative position of the LED, slides, and optics-lens to adjust a focus of the device.

In addition to the above-noted prior art, the present invention may also be compared with additional prior art, as follows:

(1) U.S. Pat. No. 7,390,092=(Bellveau)=U.S. Ser. No. 10/290,660=Filed on Nov. 8, 20012

(Image Project Lighting Device with Visible and Infra-Red Image)

1-a: From Detail description (Column line 6) The '092 Bellveau teach

"An Apparatus 10 comprised of a central controller 150, a communication interface 138, and IPLE (image projection lighting device) 102, an IPLD 104, and an IPLD 106. The IPLEDs 102, 104, and 106 are electrically connected by communication lines 142, 144, and 146, respectively, to the communication interface 138. The communication interface 138 is electrically connected to the central controller 150 by communication line 136. The central controller 150 may be a dedicated control console or personal computer system.

The IPLDs, 102, 104 and 106 are shown for simple example, although many more IPLDs such as for examples thirty IPLDS each one like any one of 102, 104, and 106 could be use in a lighting system or apparatus, such as apparatus 10. The communication interface 138 may be a router or hub as known in the communications art."

Compare with current invention:

1-b: The current invention only one LED and image-forming piece (slide/film or digital image related displayer) and LED light-beam passing through the said image forming piece to formed lighted image and go through top refractive lens to spread out to big areas shown on indoor or outdoor surface. The '092 has camera and central controller and interface those is not use for current invention.

1-c: The current invention has the Top for LED and image-forming piece and refractive lens is fit into upper housing-parts of the said LED light and the said AC-to-DC circuit and conductive prong or AC-plug-wire is fit within the lower housing-part to form one product.

Not same as The '092 have many wires to connect with the said IPLDs even up to 30 units.

1-d: The current invention has the said AC-to-DC circuitry or circuit to supply DC current to LED light sources This is not existing on the said The '092 text Conclusion The '092 is nothing to do with current invention for any concept, (2) U.S. Pat. No. 6,199,999=(Cotton)=U.S. Ser. No. 09/203,056=Filed on Dec. 1, 1998

(Lighting System for Theater Seating)

2-a: From abstract description, The '999 lighting system for use in areas or low-level lighting, such as a planetarium, theater, museum, or auditorium, which improve visibility of objects without detracting from the overall desired low-level lighting." So '999 is to install and fit within the back of seat which is not movable and connect by prong or AC-plug-wire and people can move to insert into any location outlet for illumination purpose.

Compare with current invention.

2-b: The current invention only one LED and image-forming piece (slide/film or digital image related displayer) and LED light-beam passing through the said image forming piece to formed lighted image and go through top refractive lens to spread out to big areas shown on indoor or outdoor surface. The '999 has no such arrangement for crating the image to project far away surface.

2-c: The current invention has the Top for LED and image-forming piece and refractive lens is fit into upper housing-parts of the said LED light and the said AC-to-DC circuit and conductive prong or AC-plug-wire is fit within the lower housing-part to form one product and can plug into any location outlet or connect with AC power source by AC-plug-wire. Not same as '999 have only built-in the seat related products which is fix there forever not movable and no prong or no AC-plug-wire to connected with outlet.

2-d: The current invention has the said AC-to-DC circuitry or circuit to supply DC current to LED light source(es). The '999 has no such circuit because 1988 has no white LED or any brighter LED available at market to create the good projection such as '999 the light 2-e: The current invention product is freely move and can fit into any outlet '999 which is install fit within the seat back as Column 3 line 6 "Which the lighting system 8 is attached to the back 7, the lighting system 8 can also comprises a light source 9a which is depicted as being associated with the support 11, the cover 10 blocks light emitted upwardly from the light source 9a but permits light emitted downwardly toward the ground 6 to escape the light system. The current invention is to project light to upward to ceiling or emit too far away walls or both . . . . So, this is totally different application for products.

Conclusion The '999 is nothing to do with current invention for any concept, (3) U.S. Pat. No. 5,517,264=(Sutton)=U.S. Ser. No. 281,016=Filed on Jul. 27, 1994

(Projector Night Light)

3-1: The '264 shape is television shaped night light (Abstract line 5 and line 7) The current invention do not have display panel for side.

3-2: The '264 is the One of housing The current invention has the two or more parts has upper and lower housing parts shown on FIGS. 1, 2, 2-1, 2-2, 3, 4, 5, 5-1, 6, 7, 7-1, 7-2. And the refractive lens is installed on the upper-area of housing-parts or upper parts of inner tube or tray-assembly and on top-areas of lower positioned inner-tube or inner tube-assembly or housing-parts.

3-3: The '264 is radiation incandescent bulb is powered by AC power source with heat and will melt the top position film or slide. So, Sutton '264 is not practically and will catch fire. The current invention using none-heat, non-radiation LED light source.

3-4: The '264 without any circuit needed. The current invention has clear said AC-to-DC circuit to get DC current from this circuit and circuitry.

3-5: The '264 do not teach adjustable lighted-image and/or project-lens and/or light unit including angle, position, orientation. The current invention had this feature, so can projected-image to wall or change to ceiling or change to garage door or change to outdoor building, also can change the image-carrier and/or project-lens for steady or rotating or movable or replaceable or detachable to make desired steady or rotating or moving or changeable projected-image/pattern/light-beam.

The current optics-lens (magnify or refractive lens). This install on the high portion of housing or inner-tray-assembly or inner tube-assembly location or-and the said top-area of inner or lower position tube or tube-set or housing. This is shown on current invention drawing FIGS. 56, 57, 58, 59 and other drawings Compare with '264 which all the lens is lower or recess than the TOP of the Tube or Housing. '264 drawing the big-Image will be limited because the tube or housing wall is HIGHER than magnify lens.==>This is what '264 DO NOT UNDERSTAND THE OPTICS AT ALL.

3-6: The current invention also teach The current project LED light (Not limited to Night Light, it should cover all indoor and outdoor project light with current invention simple optics-arrangement). The current invention teach some applications has movable or rotatable of image-carrier or project-lens(s) (to move and adjust parts or housing or image-carries(s), optic-piece(s) to make the said housing or-and project-assembly or-and image-forming element or-and optics-lens to MOVED, ROTATED, ADJUSTABLE to make the enlarge image to change or moved to other location This also '264 did not have any discussion at all.

Furthermore, the current invention teaches for more than one or plurality of different project-assemblies and each of project-assembly has its own LED and image-carrier and project-lens(s) for steady or rotating or both combinations. The '264 never had such design, concept, idea, constructions. 3-8 Movable or rotatable or constructions. 3-8 Movable or rotatable or adjustable. The current invention has join-arms or bar or pole or ears or joint-kit to make the said movable or rotatable or adjustable function and (From FIG. 62 shown the current invention without the wires twisted together or damaged arrangement).

Compare with '264 which has nothing can change the enlarge image or patterns or light-beam shown on locations because '264 do not have such constructions.

3-7: location for refractive optics-lens The current invention the said refractive project optics-lens location is big difference with 2264 fact from current invention. Lens (4e) and (5e) both is on the top-area of tube or top-area of inner tube or tube-assembly or inner tray-assembly or inner housing-parts It is so clear the optic-lens is NOT INSIDE THE TUBE.

These are major different which '264 have a lot of optics-lens is fit within or inside the tube which also lower than surrounding housing, so the light-beam will be limited by wall of the tube inner diameter or outside housing wall and light do not spread-out as the current invention . . . .

3-8: The prior arts '264 compare with the current invention for below other (7 features) vs '264 Examiner already point out the difference parts:

Sutton '264 V.S. current Invention including following comparisons:

1. Light source use Bulb which is radiation light source from inside filament and light beam spread out everywhere for 360 degree illumination LED has limited light beam emit angle such as 30 degree. The current invention also teach 2 groups of LED can be (1) One project function and one for accent light function as FIG. 3, 3-1, 3-2, 4, or (2) Two group LEDs both is for project function for different arrangement for different project construction for different center, sides, surrounding movable project for more than one project applications.

2. Circuit work with AC current no need any circuit for AC change to DC current by built-in or external transformer device AC-to-DC circuit. Need AC-to-DC current to meet DC operated LED to work, as the description the circuit including IC or and wireless controller including IR/RF/Bluetooth/wi-fi/Z-way/Zig-bi to change the functions, selection, setting, adjustable or to control more than one LEDs for flashing, sequential on different time, cycle, duty cycle, brightness to get the moving effects so no need use the motor and gear-set. This is other features as current invention had and Sutton do not have these features for IC control more than one LEDs color and brightness.

The Problem for '264 and current invention solve these 7 by its features:

(1) Heat & Parts 264 use Bulb which is high temperatures light source, which almost get over 80 degree (C.) and will accumulated since bulb is turn-on and start to accumulated. So '264 bulb heat will need to use Non-Plastic material items top of the bulb because all heat is flow to upper and '264 device is put all the parts on top, so the heat will up to 80 or more higher. This means Top items (slide 412 and in-out lens 414/415) do not (1) Plastic injection Lens (2) Do not be Film or slide which made by plastic subtracts. This will cause the any plastic-object deforming of melt. So this is why Bulb project never show at market. Sutton FIG. 4+5+6 is not possible to has slide (412) put in-front of the Bulb because in-earth not existing such slide (412) can in front of bulb (market all Night light bulb glass around 3 inch VS. ¼ of bulb glass-body). The 3¼ inch distance between Bulb to slide→In earth no such technical can make out slide till today. The current invention use LED because LED is cool light source. The current to project cartoon image which need use the plastic lens and film/slide which all made by plastic. Especially the full colorful cartoon image which need use film or slide so can project out the real image. There is no any replaceable film or slide from current technical and this is '264 do not do at all while use Bulb high-heat light source.

==>Solution: The current invention claim add the Plastic material for (a) image carrier (b) the lens is plastic injection piece to overcome the '264

(2) Light source VS. light path; the '264 use Bulb as light source which is radiation Light cover 360 degree all over the inside of housing which the top of bulb light brightness is so limited so '264 has the top and side to illuminated the TOP and SIDE display, this is why '264 need a reflector (407) to try to get more light reflected to top but it will not all light into the slide carrier (412) and image (103). The current invention using LED which has narrow angle for light emit direction so can make all LED light beam emit into tube or-and tube-like housing (com or cylinder shape). Key at the almost all the light beam is emitted to the plastic material image-carrier do not like '264 only maybe 15% (top arc of bulb) emit into image carrier. The light path for current invention for projection very simple, LED light-beam passing through front image-forming-unit in any geometric shape or inside or alone of disc, disc with teeth, Gear-units which is movable or rotatable, or rotating for disc or holder or disc-with-teeth, gear-unit by manual.

Also, the Tray-assembly or tube-like-tray-assembly may include all different tube-like tray, tray, holder, disc and disc-like, disc-with-teeth, gear-unit to load the slide, film, image carrier for rotating or moving by manual or motor-set by manual by automatically, by wireless controller.

(3) Light source vs product size The C7 bulb glass size is around a cigarette light length 3-4 inch which is very long unit already+ too hot so do not install any '264 claim (transparent film has image recorded) or image (103) because distance from '264 should be less than ¾ inch.

Because the Bulb is too hot, so all '264 top of housing may need use fiber or super expensive anti-heat plastic+big distance from bulb to arrange lens frame or non-plastic image-forming units. This is too big to cause the light device too much weight so the said prong of night light do not insert into outlet well and not-fall apart. The current invention use the LED light source which fit into front tube or fit-within the tube-like housing which all light beam is almost 100% inside because LED is fit into or emit into or fit within the 15 tube or tube-like housing. Because it is cool light so no any damage the any frame, parts, holder for image-forming unit or the said plastic-lens or plastic film or slide. V.S. '264 add the plastic material for the (a) holder or frame to hold image forming or film or slide (b) clear said the LED is fit-into or-and emit-to or-and fit-within the said tube or-and tube-like housing.

(4) Optics theory and concept and lens arrangement Big Difference'264 has a (project system) different with current invention as below:

(4-1)'264 has more than one lens (414) (415) for image input and image output lens which is different optics theory as the current invention including.

(4-2)'264 has the simple one refractive-project top optics-lens which has the refractive-theory which only need one piece and the MOST IMPORTANT.

(4-3) CURRENT INVENTION THE ONLY ONE top refractive project OPTIC-LENS is LOCATED ON TOP-AREA of the Light housing (FIG. 2 Detail description (0048) line 4 to Line 6 "The night light has atop body (2m) with an opening (2e) to allow the telescoping optic element (2d) lens (2k) to be installed and project . . . " Same as FIG. 3 has opening (3c) on top-area of housing to be installed the optics-lens (3m)=>which means magnify-lens is on housing top-area location or top-areas or the inner tube or inner-housing). This make the Projected image can spread-out to wider areas like current invention can do. V.S. '264 to arrange Image-in (414) or image-out (415)

(4a) deep inside FIG. 6 (Furthermore image been block out by top frame), or (4b) lower than the top surface FIG. 4 and FIG. 10 (image will be limited in size) so '264 All image size out of the night light will be same size of the '264 claim's "same size of the project-system diameter", so NEVER CAN SPREAD OUT like the current-invention optic-lens ON TOP-areas SURFACE as FIG. 2 (2e) and FIG. 3 (3d) and FIG. 4 (4e) and FIG. 5 (Se) shown on current invention=>This is Totally different for the optics-arrangement and optics-result to get wider spread-out image on ceiling! NOT SAME AS '264 all the image in (414) or image-out (415) is deep inside or far-away from top-surface of the Night light [ ] This is totally different design on the Optics. In spite of;

(4-b-1) the other Liu's LED night light, or (4-b-2) Not majority light into Image-forming or image-carrier, or no AC-to-DC circuit, or (4-b-3) High-heat to destroy the slide (text of '264) or (4-b-4) transparent film (claim of '264) Both are the FILM or SLIDE made of plastic which equal the '264 is not workable concept, so this is invalid at all, or (4-b-5) Totally different optics-lens arrangement to get different image projected concept, construction, and result, or (4-b-6) One top project piece optics-lens on housing top-area or above inner tube or the inner-housing position v.s. deep or below the top openings, or (4-b-7) cost different, assembly different, optic-theory difference. or (4-b-8) Big difference for optics-arrangement which is the most important for projection light which The Optics-design and arrangement is key to make the seasonal image to show out.=>Basing on these (8) major difference for current invention for (UTILITY PATENT) which only need 1 or 2 different on concept, construction, circuit, design, Optics-lens number, or optics-theory, or optics-locations, or optics-result should get allowed.

The current invention has FIGS. 4 and 55 show all kind of prevent leakage light tray/holder/disc assembly and also see FIGS. 56,57,58,59,60 show the disc-with-teeth, or gear-unit drive by motor and its gear-set to make it move, rotating. This is not shown on Sutton concept or text.

Furthermore, the said slide, film or image-carrier in geometric-shape an install or hold by disc, disc-with-teeth, gear-unit as FIG. 56,57,58,59 shown which can be in horizon or vertical arrangement as long as image-carrier is in front of LED or light-source.

This is never shown on Sutton and all other 20 US prior arts.

(5) Optics theory and concept and lens arrangement Big Difference (d) The '264 lens is made all image go through the 1st image input lens (414) to make all light input to spread-out and go through the 2nd image out-lens which means spread-out wider image to into 2nd optic-lens and spread-out again.

This will make image touched or make image is not clear enough.

The current invention only use 1 piece of top refractive project optics-lens or outer-cover which is double curved so can make the clear image and simple construction and lower cost especially not MELT or DEFORMING than the '264 FIG. 4 and FIG. 5 for 2 optics-lens.

Plus the FIG. 6 is more different for focus adjustment lens need to use 3 pcs or lens and it even more worse the image came out from slide (142) is deviated and part of light is BLOCKED by top (Frame or parts). This is ridiculous optic-design and also too costly than the current invention.

The most important '264 has 2 or more optics-lens on FIG. 5 and FIG. 6 and FIG. 10 not install on top or above the housing. Those are different optics-construction and theory and arrangement with current invention for optics-result, cost, construction, concept, physics theory. Further move the '264 FIG. 6. So this is why the '264 claim have to said the image need go through the project-system. Not like current invention only 1pcs of double-sides curved optics-lens is enough and better design. The current optic-theory for current invention the said project-lens is located on top of the inner-tray assembly as shown these FIGS on parent filed case including (# FF-I) and (# TT-2010) or (# DD family drawing) show the disc or disc-with-teeth (gear-unit) rotating with built-in plurality of project-lens or image-forming-unit slide or film. Also have claims show have extend-and-retract system like telescope unit for adjust the project-lens distance to the film, slide by manual or automatically as (# FF-I) claims. These are meet current invention for physics theory.

(6) Rotating feature VS. '264 Fix project direction '264 unit or design is for fixed project direction. The current invention has the ball or sphere or low-high dome shape outer-cover or optics-lens to load the "project LED+image-carrier or displayer+Top surface has refractive lens" inside so while force apply to the ball or sphere will also change the project direction==>This is never been found by examiner for this unique "ROTATABLE OR ADJUSTABLE THE PROJECT ASSEMBLY OR PROJECTED IMAGE DIRECTION" and "The current invention need all construction for make the electric deliver to inside ball FIG. 4 and FIG. 5 "and" The current invention has construction to make the ball movable or rotatable which need extend into main-body housing FIG. 4 & FIG. 5" same as show on current invention show the wires (4±)(4g) (4h) (4i) from Main-Body to passing through the JOINT-EARS and rotatable connector or contactors (4g)(4h)(4g')(4h') of ball and connect with inner LED's electric poles FIG. 4 and FIG. 5 " . . . These are shown on the current invention drawings. Which are totally different construction and totally different arrangement and totally different result to make the movable or rotatable for the project-image device than '264, The current all these movable or rotatable features so can project image to ceiling or wall. Not like '264 only to ceiling for project image. The said Rotating features as also shown these FIGS on parent filed case including (# FF-I) and (# TT-2010) or (# DD family drawing) show the disc or disc-with-teeth (gear-unit) rotating with built-in plurality of image-carrier or project-lens as claims. So the slide or film or project-lens is rotating by motor and gear-set for desired directions and counter-wise or/and anti-counter wise for one or more than one of the optics-lens or grating film to get desired light-effects. Sutton do not have such arrangement. Rotating can incorporate with manual or motor-set by manual or auto IC controller or RF remote controller.

(7) image carrier; The '264 claim on text without any details description only said (103) slide holder. At the Claim said "Transparent film has image recorded" which can prove it is "Plastic" and within that ¾ inch distance (Compare with Glass top of C7 Bulb which is 3 inch long, and from drawing slide holder is within the ½ to ¾ inch) which prove the film will be deforming and melt or too hot cause the "record image" been vanish because it "film or slide" chemical very sensitive to the heat. This equal said '264 patent is not workable item while use C7 bulb which accumulated heat up to 80-100 degree Centigrade so it will melt every plastic or film even PC film. So, this is why the current invention is 20 ONLY WAY to use LED cool light source . . . . This is major issued offer evidence for '264 is not workable and not equivalent for LED light source. The image carrier is in front of the LEDs. The image carrier or slide or film can be any geometric shape to allow LED light-beam emit into to form the tiny lighted image.

The image carrier made by plastic or plastic-project-lens with texture or marking or prism lens which also plastic, so bulb as Sutton will deform it or even catch fire. Movable or rotatable or adjustable parts or housing to change or more or adjust the enlarge image From '264 details description or drawing show nothing for these "Movable or rotatable or adjustable parts or housing to change or more or adjust the enlarge image".

(7-1) From Current invention FIG. 4 and FIG. 5 show very clear the wire-arrangement and Pole/ear for ball housing to make rotating along the 2 ears.

(7-2) Also show the wire (4f)(4g) (4h) (4i) arrangement from base into rotating or movable ball housing, (7-3) Also shown the rotating contactor (4g) (4h) (4g) (4h') it will not tringle-together for wires while make a rotating or move of ball as FIG. 4 and FIG. 5.

(7-4) Also shown on FIG. 2 and FIG. 3 show how to make the enlarge image to change or adjust or move by rotating, movable disc which can install plurality of image-forming or optics-lens.

(7-5) The Abstract discussed the (Magnify optic-lens) and (Bigger image) which show very clear the project image is from (SMALL→Enlarge to Bigger image by Magnify optics-lens). Which it install on OPENING of TOP HOUSING . . . Not inside tube as '264.

(7-6) These are all the current invention disclosure and the said '264 never show there really features for projectable. The current invention and parent filed case has shown Rotating features as FIG. 45. 43, 54, 55,56,57,58,59,60 also shown these FIGS on parent filed case including (# FF-I) and (# TT-2010) or (# DD family drawing) and also inside parent filed case (# FF) (# HH) series claims said The holder, disc, disc with teeth, gear-set has plurality of the image-carrier, film, slide tit within so can rotating by manual or automatically with motor-gear-set. Also, the holder, carrier, disc, disc-with-teeth (gear-unit) has built-in project-lens (refractive-lens) so can move or rotatable or rotating to make desired moving light effects as claims of (# FF-I).

(4) U.S. Pat. No. 5,535,230=(Abe)=U.S. Ser. No. 368, 552=Filed on Jan. 3, 1995

(Illuminating light source device using semiconductor laser element)

4-1: The '230 Abe laser illuminating light which is use for a vibrating place or a portion where an electric lamp is hardly exchangeable for new one[.] This is totally not same as current laser project light for outdoor to present the desired lighted-image, lighted-pattern, light-beam for every-day or seasonal time where has no vibration or difficult replace.

4-2: The '230 laser semiconductor element mainly for outputting a laser beam of a particular wavelength in the range from infra-red ray to ultraviolet ray=>This is different with current invention to use simple Red, or Green or Blue laser light beam go through the grating-piece (Detail definition of grating-piece list on below Big text for definition). The current invention does not change any wavelength for input laser light-beam to output end. This is different.

4-3: '230 laser to change the wave length from infra-Red range to Ultra-violet ray. The current invention is keeping same wavelength laser input light-beam go through the said diffractive-piece in flat or coiled roll or folded or any geometric shape to allow the single high-wattage laser-beam split or divide into plurality desired shaped-image, shaped-patterns, shaped light-beams.

Conclusion: The totally different wavelength change by semiconductor as '230 compare with current invention for only make one laser light-beam go through the diffractive grating-piece is totally different physics theory and one is Apple one is Noodle . . . Totally different and no any similar concept, construction, electric or physical at all.

(5) U.S. Pat. No. 5,926,440=(Chien)=U.S. Ser. No. 08/923,988=Filed Sep. 5, 1997 (Electro-luminescent night light and time piece)

5-a: The '440 is same inventor prior art for the "Electro-luminescent light source (EL)" he said EL is powered by AC (Alternative current) so no need any AC-to-DC circuitry or circuit to make the illumination.

The current invention has the different light source with the said LED light source that is powered by DC (Direct current) so need AC-to-DC circuitry or circuit to make the LED for illumination.

5-b: The '440 is one unit sealed inside one housing-part and all the EL light-beam is for back light the front clock-arms or LCD displayer screen to show out time related message to people. And, also offer light for dark environment. There is no any magnify or refractive-lens to project image or pattern or both to outside the said EL time piece light unit.

The current invention has the upper housing parts has the project-assembly including LED to emit light-beam to front image forming-piece to form the miniature lighted patterns or image or both to go through the front or top refractive-lens to magnify and project to outside wider areas including ceiling and the said far-away wall or floor or all areas for indoor or outdoor.

Conclusion;

So, '440 is totally different light source, different (1) current operated light source, (2) application, (3) different light-effects for back-light and far-away distance image or patterns or both projection (4) different construction for sealed-unit (5) housing can adjustable angle for lighted patterns or image or both (6) different housing number for one sealed-unit VS. current invention for upper and lower housing-parts.

So, the '440 co-inventor's prior art is totally different with current invention.

(6) US 2005-009-4388=(Booty)=U.S. Ser. No. 10/699,251=Filed Oct. 31, 2003 (Dual-Beam Lantern-flashlight)

6-1: Booty '388 teach one hand-held lantern have front end light (20) and rear bottom light (29) also act as a handle-bar (22) which also is a battery compartment.

The current invention including;

6-1-a: AC powered light get the AC current form wall outlet if terminate the wall outlet power, the built-in night-light will lose power except the power-fail light can still work.

6-1-b: The said current invention get AC power but the inside use LED(s) as light source so need at least one AC-to-DC circuit to get DC current for inner DC powered LED(s) or IC or sensor or power fail circuit to have power for operation.

6-1-c: The '388 application do not have any image-forming, display-unit or image-carrier or may different optional other accessories including motor, gear, gear-set, film holder, tray, disc, disc with teeth, change focus, retract-and-extend similar telescope to change optics-lens position against the inner image-carrier, magnify refractive-lens, so this is totally different the theory of optics.

So '388 Botty for dual-beam for DC powered 1s nothing to do with current invention.

(7) US 2009-0021946=(Nozaki) U.S. Ser. No. 12/224,364=Filed Mar. 30, 2007 (Projection Device)

7-1: The 364 Nozaki mainly for a camera or digital video device which has the image-catching and image saving kits and the built-in LED(s) to project the image from the DC-powered camera or digital video through a very complicated optic-lens assembly (226), (228a) (228b) which has reflected and triangle-lens to get 90 degree light-beam to change direction from input-end to output-end. These complicated and super expensive optics-lens(s) or lens assembly is not same as the current invention for following difference.

7-2: The current invention have AC power source from outlet and have at least one of the AC-to-DC circuit to get the DC current for inner DC operated LED(s), IC, Circuit, sensor, detector, power fail sensor to make the desired multiple function for Plug-into outlets by prong for indoor application or by AC-Plug-wire for outdoor applications.

7-3: The current invention have refractive optics-lens in front of the image-forming-piece or image-carrier or film or slide and most important the LED light-beam emit out and always is go straight through to image-carrier which in-front of the LED.

7-4: The current invention the do not make the image have 90 degree turn direction as the said '2364 lens (228a) 9228b).

Conclusion: This is totally different with current invention.

(8) U.S. Pat. No. 5,404,283=(Yantz)=US Ser. No. 861,151=Filed date Mar. 31, 1992 (Outdoor framing projector)

8-1: From '283 column 7 line 65 "The optical system 144, which includes the lamp 142 and a reflector 138, a shutter support 148, a rear lens 150, an optical stop 152 and a front lens 154, occupies substantially the entire lateral area of the interior of the housing 12, because of the size of the elements required and the need for supports for the elements. Compare with the current invention different including:

8-2: '283 teach a very expensive and complicated optic-lens system as above listed.=>The current invention had so such complicated optic-system as above list.

8-3: '283 teach a lot of text for recirculation cooling system cools a lamp sit the warmed air flowing longitudinally back to front past top and side walls of the housing provided with cooling fans and a return air duct adjacent to the bottom wall drawing air from the front of the housing back to the inlet of the fan. (From Abstract)==>The current invention do not have such "Fan Recirculation System" at all.

8-4: '283 shown on column 9 line 11, "As noted above, the lamp 142 is preferably either an incandescent lamp, such as a quartz lamp for example if the projector 10 is to be used in a dimming application or a metal halide high-intensity discharge lamp, which may be desired for long lift and opening economy . . . .

An incandescent lamp, which is shown on the drawings and has been found suitable for use with the reflector specified is commercially available from GTE products Corp., OED Division of Westfield, Ind., under the commercial designation Sylvania EGG, 750 W. Quartz medium pre-focus. This is a 750 Watt lamp, it being understand that smaller or larger wattage may also be used.

Compare with current invention for 0.25 Watt or Maximum is 1 to 3 Watt LEDs which no need any fan recirculation. Furthermore, the /283 use 750 Watt for totally different Quartz-Lamp that is totally different light source.

8-5: '283 use Quartz-Lamp for AC power and current invention use LED which is DC powered light source, so current invention need AC-to-DC circuit to get DC current for inner LED(s), IC, Sensor, Switch, Detector, Power fail failure system, motor for rotating the image-carrier or disc with teeth or disc have built-in plurality of the image-carrier or rotating the optics-lens or plurality of optics-lens fit within the disc or holder or rotatable disc-with-teeth or gear-sets. So, this is totally different circuit, electric, applications, sensor, trigger system and the rotating the said one or more optics-lens and image-carriers.

8-6: '283 need use reflector system to make light concentrate to front position. The current invention is no needed such reflector-system.

Conclusion: This is totally different any aspect.

(9) US prior art=U.S. Pat. No. 7,667,770 Mazzochette 9-a: '770 teach (Column 2 Line 41) "a retrofit recessed LED down light fixture (10) includes a housing can 12, base 14, generally annular trim 16 and mounting bracket 19, 20 interconnected" and (Column 2 line 64 to 67) "A sealed reflector cone 50 focuses and directs light from the LED array 48 out of the light fixture 10, a heat sink 52 is mounted within the housing can 12".

The main application and construction are totally different with the current invention has the upper parts for project-assembly (LED+image forming piece+top refractive-lens) and lower housing-parts have at least one for AC-to-DC circuit with prong or AC-plug wire to connect with the anywhere preferred outlets.

Furthermore, the current invention lighted-image or lighted-pattern is emitting to upwardly to ceiling or emit to far-away wall surface or floor or all with adjustable angle kits. D The said '770 is fixed and only can emit light to one locations. This also is not same as current invention.

Conclusion: The '077 is nothing to do with the current invention.

(10) US prior art U.S. Pat. No. 8,657,464 Lundberg et al 10-a: (From Abstract) '464 is teach "methods and systems of emitting different light from a multiple mode light emitting device" by a plurality of 1st and 2nd LEDs in a 1st or 2nd ring arrangement" with rotatable for 2nd LEDs.

This is nothing to do with the current invention because the current invention only has one LED for lighted image or patterns or both projection and other LEDs is for the 2nd function for night light which no need the said (a) ring arrangement and (b) the said LEDs inside for Night light or other color changing or color selection function without for rotating purpose. (c) The current invention for rotating or spin is for changing the image or-and patterns present location or direction not for rotating the said 2nd or 1st plurality number of the said 1st or 2nd LEDs.

10-b: '464 as shown on FIG. 7, the power source for the '464 is one of DC power as the diagram show (LED Power source 702) and also has the reflectors or lens rotating (106/108) which is not existing or current invention and (controller and actuator 502). These 3 major parts of '464 FIG. 7 is not existing and use for current invention at all.

The current invention has no such 3 major parts of 464 described so '464 is nothing to do with the said lighted image or-and patterns projection which also has no any magnify project refractive-lens.

Conclusion:

The current invention for (1) projection has only 1 LED and 1 image forming-piece and 1 top magnify refractive projection lens without '464 3 major parts at all so different construction and (2) The current invention use the AC-to-DC circuitry or circuits to get DC power for LEDs which is not same as '464 FIG. 7 show is DC batteries and (3) the current invention without the '464 FIG. 7 for lens (106) and reflector (108) and Motor (706) to make the said LED for rotating and get light concentrate to direction. So, '464 is nothing to do with current invention.

(11) U.S. Pat. No. 8,089,691 Arbuckle 11-a: The '691 is for Desktop Microscope application, The '691 clearly describe for the patterns shown on the object plane of the optics-microscope. (Abstract) Line 5 "A pattern mask is located within the illumination path for projecting one or a plurality of objects, structures, or patterns on a samples located at the object plane of the optical microscope" [.]

The current invention for image forming-piece is one of Slide or Film or Digital data displayer that is not "One sample its structures or patterns" and the current invention lighted image or-and patterns is colorful from slide or film or digital displayer image related image which is not the black and white for "object samples".

11-b; The '691 is not a device to have lighted image or-and patterns use only refractive-magnify lens to far-away distance top ceiling or-and surrounding walls [.] From Abstract line 8 "The pattern mask may be use with structured illumination microscope (SIM) to project a MOVING STRIED OPTICAL GRID PATTERN OR RONCHI BULING ONTO THE SAMPLES at the OBJECT PANE in either fluorescence or reflected bright field image so can prove he said (lighted patterns or image) is totally different.

11-c: The '691 light source (20) or (27) which is came from side-wall into the microscope device and image is present on 90 degree with the light-beam traveling as FIGS. 1, 2, 3. Furthermore the '691 light source (20) (27) not only is came from 90 degree side and need at reflector to change the light-beam into the object-mask so can make clear image of "Sample object". This is totally different with current invention that the LED light beam is straight to emit to image-forming-piece and go through the top or front magnify refractive project-lens all 3 major parts for current invention for project-assembly is in one straight-line without (1) Light source from 90 degree side direction, and
(2) Need the reflector or mirror to reflect the light source (20) (27) to turn 90 degree into the microscope-tube, and
(3) Also, the said '691 has no AC-to-DC current or circuit built-into the said microscope-tube or housing, and
(4) The '691 light source has to go though many expensive optics-lens(s) to make the light-beams strong enough to illumination the "Object Samples" the current invention no need such plurality of optics-lens and accessories (19) (59) (24) (60) (62) (64) (66) for get proper light-beam.

Conclusion: The '691 is totally different with current invention.

(12) US prior art—U.S. Pat. No. 7,286,101 Hosaka 12-a: '101 teach one projector that has 1st and 2nd display images on opposing side of an image display screen This is different with current invention that the LED project light has only one lighted image or-and patterns been project out to any outside surface.

12-b: The '101 has pre-designed display screen which is special made for the '101

Projector and not same as current invention to project lighted-image or-and patterns to anywhere existing of indoor or outdoor surface including ceiling, walls, ground, fence, garage door, building, housing or garden or patio areas or any combination 12-c From '101 Column 2 (Summary) Can see the '101 special made display screen is one of;

(12-c-1) has reflective parts or transmissive part (column Line 13 to 20), and (12-c-2) The image has "incident side" and back (Column line 16 to 26) which is more than one image and current invention without able to project front and back construction, and (12-c-3) '101 have to have the reflector (Column 2 line 17) to help to create image which current invention without any reflector or reflective parts for application, and (12-c-4) image screen is shown on the opposite side (hereinafter "back side"-column 2 line 26), and (12-c-5) the display screen is special made and "has plurality of reflective and parts which formed as a narrow strips", this is totally different with current invention.

Conclusion: The '101 is nothing to do with current invention.

(13) US prior art—U.S. Pat. No. 8,328,368 Luciamo 13-a: '368 teach the laser light source (56) incorporate with mirror (53) (50) to get the multiple reflected laser light beam. This is a different light source (Laser VS. current LED).

13-b: '368 incorporated mirror(s) to create the multiple times reflection and also change the light traveling path from straight to 2nd angle and to 3rd angle to form the plurality of laser light beam. This is nothing to do with the current invention for 1 single lighted image or-and pattern created by LED light beam go straight to the image-forming-piece and go straight again to the top or front magnify refractive project-lens to spread out to outside the LED light for indoor or outdoor ceiling, walls, fence, garage door, building, house without any reflective-piece and without multiple time reflection to change the single. The said laser light-beam is plurality number of the said laser light-beams.

Conclusion: '101 is nothing to with the current LED project light at all.

(14) US Prior Art (Lai)

14-1: The Lai 042 show the Cylinder body which has a complicated construction to make focus adjustment. Which compare with the current invention FIG. 1 to FIG. 9 can see the current invention especially the FIG. 2+3+4+5 show the LED light source which is 5 mm Diameter and length around 10 mm. which is totally different with '042 for the light source use. The '042 complicated construction are different with current invention at all.

14-2: Lai '042 the power source need to get from outside transformer (12) and through the cord (121) to connect with inner light means (Column 2 line 63 and Column 3 line 11 to line 14)0 so this is not same for the current invention LED light source is connected with Built-in housing simple Bridge-circuit because LED only need 20ma current so no need any Big outside transformer (12 of '042) to supply the big current. D This is totally different electric arrangement with '042 for transformer and big cord (121) needed.

14-3: Lai '042 the lens (22) and photo (7) is fixed on the lens holder (25) and front case (221) which is a frame construction and is not like current invention the (image-forming kit or slide or film and lens) is install a tube or housing which is sealed and prevent light to emit out because LED light beam is very limited light so do not leakage out. The current invention all image-forming kits/slide/film and project lens is sealed inside the tube or housing . . . The '042 Lai is fixed on a hollow-frame and light can leakage to everywhere.

14-4: Lai '042 The all lens (22) and Photo (7) is sandwich for frame (221) (23) or the (25) (251) which are belong to frame parts with screw to built-up the construction. Not like current invention for Tube or housing and inside has the installation-gap to install or arrange and not allow Limited LED light beam emit-out. So these are totally different on (a-1) construction (a-2) electric and power source and circuit (a-3) light leakage and frame leakage light everywhere (a-4) Lens or photos is sand-which on many frame or extra piece so different with current invention for simple installation.

Conclusion;

The Lai '042 is not any similar with current invention for size, construction, concept, circuit so not any similar with Ivan invention.

(15) US Prior art U.S. Pat. No. 5,321,449, Coccoli et. al
Teach an incandescent bulb Flashlight projection 15-1: The Incandescent flashlight no need to have Bridge-circuit to change the Home appliance electricity AC to the direct current (DC) at certain LED working voltage and current to make the light turn on. So, the Circuit for Portable flashlight VS. Home use Indoor or outdoor light circuit is different.

This is not said all light source (Incandescent bulb) and (LED) is same and all belong to light source.

The incandescent bulb to use current invention will burn out whole tiny unit because radiation heat and very hot than cold temperatures LED . . . This is not equivalent or replaceable at all.

15-2: The portable Flashlight projection.'449 construction

The '449 has the different construction with the current invention for enlarge head (14) at one end which has straight tangential spaced to install the Reflector (28) because the bulb light is radiation spread out so need reflector to concentrate bulb light beam to front.

This is not same as LED light for narrow angle to emit light so no need such (Reflector 28)0 This is other construction and light source difference.

15-3: The portable flashlight projection '449

The reflector (28) with integral socket (30) to install the bulb. The current invention the LED on the end of non-reflective tube. Different for '499 install on the reflector.

15-4: The '449 the power source (32) is carried within the housing (24) for illumination the light bulb (20).

The current invention gets power from outlets which have unlimited power same as home electricity. Not limited power like battery.

15-5: '499 need a switch to manual to turn on and turn off the flashlight.

15-6: '499 projecting device 10. Includes a flexible holder (40) with a central socket located within the transverse slot (16) in the enlarged head (14) which is not same as the Current invention Slide or film is install within a light non-leakage tube or housing . . . Not same as '499 to into s disc and disc need a holder (40) to hold it and allow to change slide.

From above (b-1 to b-6) for electric, for construction, for construction, for applications, for power source, and for light device is totally different with current invention.

(16) U.S. Pat. No. 7,001,027-Fujisawa et. Al 16-1: From FIG. 1: Column 4 line 25 "the light source lamp unit 10 that irradiated a light beam emitted by a light source lamp 11" and has an ellipsoidal reflector (212), a-sub-reflection mirror (13) and a parallelizing concave lens (14).

VS. current invention:

current invention had no such complicated parts (11) (212) (14) to make lighted patterns or image project to outdoors including, fence, wall, building, house, or indoor ceiling, walls, floor and powered by AC or DC powered source.

The current invention use LED light source which is not belong to "irradiates light mean" device. LED light for current invention only had 30 degree emit direction so can 100% into tube without light-beam leakage out from tube, or tray, or holder wall even it is more than one piece of tubes, trays, holders assembled together.

The '027 irradiation light aligned by the eclipse reflector (212), so light parallelized by the parallelizing concave lens (14) and irradiated to the integrator illuminating optics system (20). The current invention does not have (212) (14) (20) at all.

'027 has the first lens array (21) and second lens array (22), the current invention has so such (21) (22).

'027 further PBS array (23) need an alternating of Polarization separating films and reflection mirror. This belongs to totally different refraction optic-lens. The said polarization separating film is a Light-BEAM FILTER . . . Like sunglass to filter out the non-necessary light-beams. The current invention never can use this for colorful lighted patterns or image projection.

So, From the '027 which is totally different optics-construction, optics-theory, optics-elements, optics-lens, light-source(s) and purpose for applications.

(17) US 2002-015-2656 Huang 17-a: The '656 is one of the Back-light application which the light source is the incandescent bulb (41) and the inner lampshade (30) and a magnifying outer lampshade (32) for the application is too costly. The current invention having a limited angle for light-beam and not a radiation light-beam for incandescent bulb (41) so '656 can make 360 degree light passing through the surrounding wall. That is not same as current invention for limited angle have LED light-beam.

17-b: The '656 magnifying glass (32) fixedly mounted on the base (40) over the inner lampshade (30) . . . . The outside wall of the magnifying outer lamp shade (32) is not a smooth wall. The current invention had no WALL have optics-properties furthermore the "Magnify", Also, No idea how the '656 can make for this function on a WALL.

17-c: From [0039] The outer lampshade (32) has a plurality of ribs (W) on the outside wall (34) producing a convex lens effects to magnify the apparent dimensions of the inner lampshade (30). So, '656 magnify is by a RIBS on the Wall. The current invention for tens drawing no anyone to make optics-properties on the wall. No any optics-treatment is RIBS ON WALL.

17-d: From '656 all image or screen to be seen is on the lampshade (32) without any image shown on distance away on the ceiling, housing, garage door, or fence or front entrance Door. So, this totally different application than current invention.

Conclusion: '656 is other technical for radiation light-source and different application and different construction so nothing to do with current invention.

(18) Re: US prior art-(2005-019-5598) Denes==

From the definition for Grating optics-unit for laser light source, which is totally with the '598 for '598 denes diffusing-lens (29) in front of '598 denes 3 light source (43)

18-1: From "Column [0047] line 15 A light source 43 includes three light emitting diode (LED's) that are disposed on the printed circuit board 30 and are configured to project light through a front lens 27, a diffuser lens 29, and a back lens 28." LED is not the single-wave length so do not project light as above grating-unit for laser (single wave-length light source).

18-2: From the above definition for grating optic-unit for laser light source, '589 Denes show on all text including [0088] [0089] [0090] [0091] [0092] [0093] [0094] lens 27,28,1614 and diffuser 10, 1601 can be different thickness or different treatment even has "A lit may also include one or more stick-on labels 95 (See FIG. 1) that may be attached to the lens or lens 27,28 to project a pattern of light from the device, Or, as Column [0089] Page 10 Right Line I" The lenses 27,28, 1614 may also be constructed with one or more shaped cutouts windows 1634, through which the light may pass, so to project image on a wall or other surface L1, L2 (See FIG. 18). The current invention for Laser is only created by "Grating-unit or grating assembly" which without (cutout, opening) or sticker to make lighted patterns. The current invention just need pre-designed grating-unit with plurality of lines or arts within each mini-meter (nm). No need cutout, no opening, without any sticker to form the lighted patterns as '589 Denes: From Above comparison:

18-3-a: The current invention is use single wave-length Laser which is not same as LED for non-single wave-length light source.

18-3-b: The current invention laser light source is non-radiation light source and Laser light beam is from laser light source location will emit to object surface for 100 feet away without spread out.

'589 is radiation light source which from location and light beam spread out and more big distance the LED light beam spread more wider so do not emit to long distance. So "589 LED light source is not good for outdoor application because '589 use diffuser lens which increase the limited LED brightness LEDs light-beam spread out while light-beam touch the said diffuser lens . . . 10,1601 (Page 10 [column 0090] line 1), or (Page 3 [column 0045] Line 1 "The lens of the present invention may be use in any application where diffused or dispersed 18-5 Basing on above listed (1-1) (1-2) (1-3) all the light source and optics-unit is totally different (a) theory, and
(b) construction, and
(c) light beam traveling, and
(d) wavelength, and
(e) light travel distance, and
(f) lighted patterns forming construction, and
(g) outdoor lighted patterns shown on far distance capability.

So, the '598 is totally different with current laser light with grating unit to make outdoor very bright laser lighted patterns or image.

(19) Re: US prior art (2005-=011-1212) Smith now is issued U.S. Pat. No. 7,056,006 19-1: '212 Smith has light bulb (13) is AC power bulb basing on the FIG. 3 electric diagram and powered by the AC current (22) so that is not the LED or even laser light source (laser diode), both need DC power. From the '212 Smith FIG. 3 and text show the light-bulb (13) is incandescent. So, this is totally different with current invention for Laser light source.

19-2: From '212 Smith FIG. 1 show the night light 910) has the opening to emit the incandescent bulb light beam to front disc (18) which has desired different front movable design. This is an optics theory for back-light arrangement. And only the multiple wave-length of the incandescent bulb can make the color changing such as [FIG. 4B] use the front disc (18b) has red, orange, yellow, green, blue, violet 6 color film or design to make the back-light light-bulb light-beam to passing and change color.

19-3: From Smith '212 is not a illegally items because the moving parts do not pass the safety standard test for drop & pulling testament.

19-4: Basing the different (a) light source (b) light source wavelength (c) back-light front design VS. laser grating film (d) light traveling distance for light Bulb is very short maybe only 3 feet VS. laser light-beam over 100 feet (e) circuit need for AC for '212 Smith v.s. Laser need at least one AC-to-DC circuit to get desired DC current, (f) light-bulb image only less than 3 feet VS. 100 feet or more laser lighted patterns or image So '212 Smith is out-of-date device.

Conclusion:

The said Smith '212 is not any relation with current laser light with grating optics-unit to make out the lighted patterns or image or contour shape project to desired place.

(19) U.S. Pat. No. 7,267,444 Black teach for apply the very precision lens-assembly to make the LED light-Beam pass through the multiple piece of optics-lens to make the lighted-small image/patterns/light-beam to change the angle from the lower-position LED(s) make Big-angle changed to form the right-ratio of the image on the SAME-WALL Surface of the wall-outlet location where the said LED night light is plug-into.

The Black multiple optics-lens have to overcome 2 trouble including:

19-1: have to make the lighted-image from horizon to the wall and change to angle emit to the outlet-location wall. This angle-change need a lot of optics-lens to make the angle changing with expensive and precisely optics-calculation.

Furthermore, the Other More Difficult trouble is 19-2: The Image present on outlet-location surface need keep the same ratio of the tiny piece of image-carrier or image-forming-piece such as slide, film. However, this is violated the basic physic-theory because while the lighted-image emit from the front project-lens to shown on the outlet surface which will travel different distance from the top of lighted-image and bottom of lighted-image. It is No any solution can keep the same ratio of the image-carrier or image-forming-piece so Mr. Black idea is never meet the basic Physics-theory of optics . . . .

So, Mr. Black '444 is Alien device except to add more precisely optics-lens assembly there is without any other solution can get overcome 19-2 to keep same ratio of image of the tiny image-earner.

Compare the current invention, the current invention did not make the light-beam traveling-direction for such big 45 to 90 degree and project image from horizon to wall changed to 90 degree to the wall.

Compare with the current invention, The ratio of the project-image is same as the ratio of the image-carrier or image-forming-piece.

So, '444 is not same as current invention on any aspect.

(20) US 2001-007-527 Lammers et. Al—

20-1: '527 have the out-of-date LED made on old time 2001. So the LED brightness is very low as column [0034 line 5 to line 14] only 10 lm up to 35 lm. Also, the old-date LED has no narrow LED so the '527 need incorporate the collimating element (14) for its LED light-source (3) for each FIG. 2A, 2B, 3A, 3B.

20-2: '527 further have the optics-system (40) which has focusing-lens (15) for focusing the collimated light beam which came from collimating-lens (14) on the image-forming surface. From column [0036 line 1 to 6] and FIG. 2A, 2B shown. The reason why need the optics-system (40) for LED light-source (3) because the old-time do not have narrow-angle emitting LED light.

Compare with current invention 20-3: The current invention incorporated with the inner-tube or housing-parts to make majority LED light-beam to front position of image-forming-piece for inner-tube or housing-parts and go through the front-area of tube or front-area of housing-parts project-lens to make refraction of the tiny lighted-image to wider areas with bigger size and clear image.

The different including following details;

(a) The Current invention no need any collimating-lens (14) or focusing-lens (15) both form the said '527 optics-system (4) [.] The current invention applied the desired light-emitting-angle LED so can let all or majority LED light-beam emit into the inner-tube or inner-housing of project-light.

(b) The current invention LED project light has AC-to-DC circuit to get DC current to the LEDs with pre-determined circuit and desired sensor(s) to plug into AC out device not like '527 on abstract last statement "the invention is a compact, light-weight, low-energy and lower maintenance luminaire". The current invention is not for compact because had prongs or AC-wire so not a carrying item.

(c) The '527 apply out-of-date LED technical such as column [0010] line 13 for "color wheel" and line 19 for "A suitable combination of LEDs also enable white light to be obtained". This is different with current invention for apply the image-forming-piece preferred is slide or film or printed or painting piece and the LED light emit is white light.

So, can created the colorful lighted image no need the '527 for "Color wheel" or "suitable Combination different colors LEDs to get white color. This means the technical for '527 is out-of-date. The current invention use the 2005 update white LED with sufficient brightness on after date for the current invention so the parent of current invention filed on 2008 since the white LED had sufficient brightness LED-light-beam go through colorful slide or film so can project the full colorful image for facade of building, housing, interior housing ceiling, walls. Or outdoor garden, fence . . . etc.

Conclusion: '527 is not same for;

The current invention has pre-determined circuit and the control-circuit (or IC) or electric circuit not same as '527 said the control electronics may be suitable outside the housing Column [0029] last sentence.

(i) The optics-theory of '527 with collimating-lens (14) and focus-lens (15) to form the optics-assembly (4) to get parallel light-beams to front image-forming-piece.

(ii) The current invention apply the update white LED so emit the white LED light beam to glow the colorful film, slide without need for suitable-combination to get white color light-beam as '527 technical available on 2001.

(iii) The current invention have details construction for movable, replaceable, detachable disk or holder or tray for plurality of slide, film, optics-lens fit within to make changeable image/patterns which '527 do not have.

(iv) The current invention have details construction for geometric housing which is movable or rotatable including ball or sphere or elongate, or cylinder shape housing and easily to change the project-directions which '527 do not have such adjustment system.

(21) US 2011-0110-093 Hsu 21-a: The '093 Hsu show the LED light has the wider light angle which is whole unit including the Top Opening and Side Body emit light out as FIG. 2 show. VS. Current invention [Oct. 18, 2016 original filed drawing] FIG. 1A, FIG. 1B, FIG. 1D show the LED light beam is only emit-out from top-cover and without any other housing body allow light-beam emit-out. Also, current invention is totally sealed unit for outdoor application. So, current invention is totally sealed-unit to prevent from rain, dust, bugs or other environment-items make the inner electric parts been wet or short-circuit as '093 did.

21-b: The '093 Hsu show the rotation body 31 mounting portion (33) is disposed between the rotation body 31 and LED module. [column 0043] line 4; The rotation body 31 of the optics-lens (3) has a bottom formed with at least one cavity (34)". So, the '093 without any parts is rotating or moving while operation. VS. Current invention [Oct. 18, 2016 original filed drawing] FIG. 1A, FIG. 2-2, FIG. 2-4, FIG. 2-5, FIG. 2-6 and FIG. 3-2 show on (text-box) the motor/moving/spin/rotating/movement/magnetic & coil means which allow the top optics means or LED or laser to change position, location, orientation to make the moving effects may selected from group combination of cloud, star, aurora, galaxy, milky river, solar system or any nature scene with wide size to be seen. So, the current invention has at least one of inner 1st optics-lens is rotating or moving or changeable position.

c. The '093 Hsu show the optics-lens (3) is located above the LED module board (4) which means the '093 optics-lens is pick-up the LED side light-beam [shown on FIG. 2 (3) with all light-beam traveling path] and from FIG. 2 show light beam is NEVER EMIT OUT from the Walls of the optics-lens (03) so can make sure the '093 optics-lens (3) is not a light-passable reflective and refractive optics-lens. VS. compare current invention [Oct. 18, 2016 original filed drawing] FIG. 1A, FIG. 1B, FIG. 1D show the LED light beam is center hit the 1st inner optics-lens which means current invention is NOT incorporate 1st inner optics-lens as PICK-UP side light beams for LED light source. So, this is totally different optics-arrangement.

d. The '093 said LED light beam traveling path on FIG. 2 and [column 0041], Shown the LED light beam on top of the optics-lens (3) is straight only to emit-out from the top of optics-lens (3) which means no any reflective or refractive optics-functions on top of the optics-lens (3). VS. The current invention [Oct. 18, 2016 original filed drawing] FIG. 1A, FIG. 1B, FIG. 1D show the LED light beam is center hit the 1st inner optics-lens which means current invention LED light emit to the 1st inner optic-lens have reflected and refracted as drawing shown. So, this is totally different optics-arrangement and basing on '093 FIG. 2 drawing for optics-lens light-beam traveling is not called reflected or reflected Basing on the above (4) a+b+c+d VS. [Oct. 18, 2016 original filed drawing] and drawing text-box details. '093 is for indoor light which is not a sealed unit so cannot same as current invention.

Finally, the current invention can combine the arrangements disclosed in the inventor's co-pending U.S. patent application Ser. Nos. 11/255,981 and 11/806,284 for more than one light source and more than one optics means with the arrangement described in the inventor's U.S. Pat. No. 5,667,736 for a grating or hologram to create a variety of different images and obtain an optimal image projection on the wall, ceiling, or floor, as required.

BRIEF DESCRIPTION OF THE DRAWINGS

FIG. 1 illustrates a first preferred embodiment of an LED projection night light, in the form of a plug-in type night light to connect with an electric wall outlet. As shown in FIG. 1, the night light has a super bright white LED incorporated with telescope or tube or tube assembly, and a plurality of slides that serve as image-forming objects through which LED light beam pass to form a tiny image that is magnified by an optic-lens to create a bigger-size image at a desired position while allowing the image to be changed at any time.

FIG. 1A illustrates the manner in which the telescope/tube/tube assembly, slides, optics-lens and LED of FIG. 1 are related The telescope/tube/tube assembly are placed in front of the super bright LED to allow a clear bigger-size image to be projected out from the other end of the said telescope/tube/tube assembly to the desired location. This is the current invention basic model. The slide or object or LED or lens can be installed on install-means of the LED light housing, which is not on the said tube/tube/telescope assembly depending on the product design.

FIG. 1B shows a roller or disc or holder in which a plurality of object(s) (illustrated by way of example as slides) can be installed and which can be assembled into the night light housing-member to enable the object(s) or slides to be changed at any time to select a preferred image.

FIGS. 2 and 3 illustrate a second preferred embodiment of an LED projection night light with changeable object(s) or slides installed in a roller. In addition, FIGS. 2 and 3 illustrates a night light with a "interchangeable power source sealed-unit" for electric components such as a prong, circuit, trigger means, LED or LED connector, the components being sealed within the "interchangeable power source sealed unit" to pass all relevant home appliance safety standards required for certification without having to separately certify the night light in which the interchangeable power source sealed unit is included even when the construction of the night light, apart from the electrical components, is changed, and the "interchangeable power source sealed unit" being replaceable by a "battery pack" to change from an AC power operated night light to a battery or DC power operated night light. It is to be appreciated however that the current invention is not limited to just a simple DC powered or AC powered product.

The tube/tube/telescope assembly has a preferred length and assembly so that the arrangement or installation all parts within the outer non rotatable, swivel, or tilt housing can be at any desired locations, including but not limited to the LED, optic-lens, slide, and magnifying lens being in single piece or sealed within a movable tube. To change the project image location for a non-swivel, rotatable, or tilting outside housing of a DC powered products, one can just simply move or change the orientation of the LED light to provide a clear image without hand-shaking to make one's eyes tired and cause sickness or eye problems.

FIGS. 4 and 5 illustrate a third preferred embodiment of an LED projection night light, which includes adjust-means to change the projector direction by rotation housing or parts means. FIGS. 4 and 5 also show that the night light has a "interchangeable power source sealed-unit" for all electric components similar to the sealed unit of FIGS. 2 and 3, to allow different night lights to pass all home appliance safety standards and achieve certification without having to undergo separate testing of the different night lights which only has the shade or non-electric parts been changed in which the common safety unit is included. The "interchangeable power source sealed unit" of FIGS. 3 and 4, like that of FIGS. 2 and 3, can be replaced by a "battery pack" to change from an AC power operated night light to a battery or DC operated night light.

FIGS. 5A to 5G show details of a mechanical means which can change the slides by push-button, and further that the night light has a "interchangeable power source sealed-unit" of the type described above in connection with FIGS. 4 and 5.

FIGS. 6-8 illustrate a fourth preferred embodiment, including details of a housing-member, parts means, telescope assembly, LED, Object(s)/Slide, and optics lens, to provide a basic construction with alternative housing construction of an LED projection night light. All of these embodiments have an outside housing with either one or more movable or non-movable housing parts, all or some of which are installed within the movable tube assembly, or on the movable or non-moveable housing.

Figure 9A:
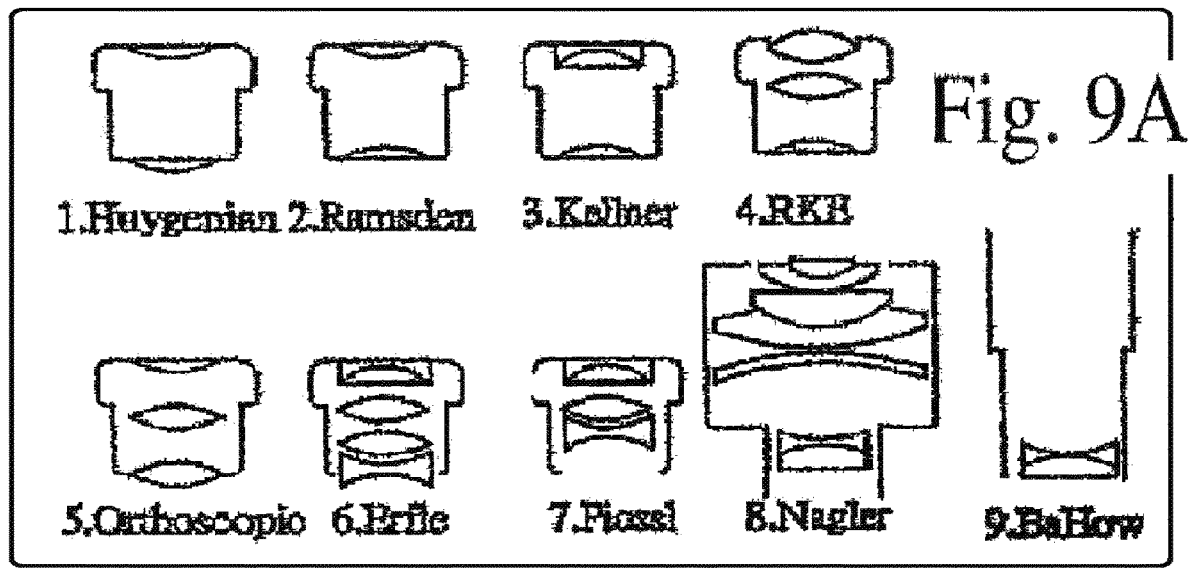
Figure 9:
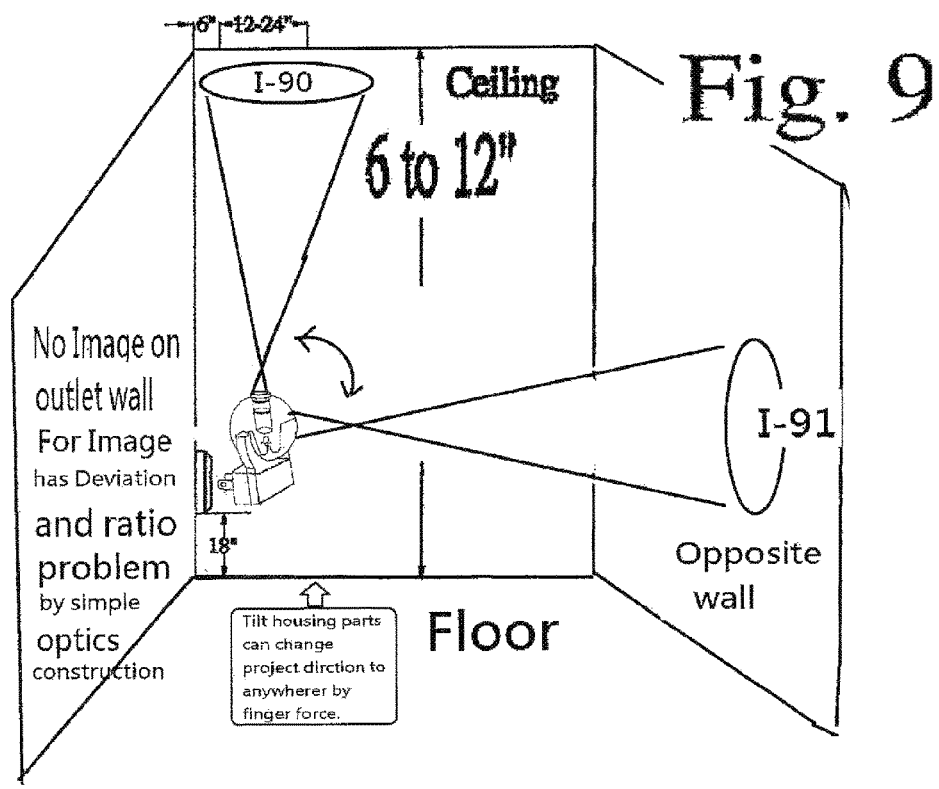

FIG. 9 shows an LED projection night light utilized for indoor applications and the said LED light may has project light or but not limited for $2^{nd}$ LED or LEDs which may have multiple LEDs to form pinhole image light which can project a variety of pin-hole shaped images which all have the same color from one or more LED, and/or serve as a glow night light for illumination.

FIG. 9A shows many types of preferred telescope and optic-lens assembly examples.

FIGS. 10-12 illustrate an optics-lens theory has (object, optic-lens and focus and image relation) used by the current LED projection light invention and application of the theory to create a desired image, so long as the light source is a non-heat light source and the slide/film can be positioned on top of the light source without deforming or destroying the slide/film.

DETAILED DESCRIPTION OF THE PREFERRED EMBODIMENTS

The LED night light with projection features of the current invention is different from a conventional projection pen, projection key chain, projection toy, or commercial presentation projection equipment. One difference is that it is used mainly for night light applications with an LED or LEDs as a light source to directly plug into an outlet device, and as a result the circuit needs to be specially designed to make use of AC 120V 60 Hz input power to change to the drive current for the LED or LEDs.

The current invention LED project light incorporates LED to supply white light beam to emit the object which location within the telescope tube and pass though the optics-lens to magnify object's tiny image to create the said Big image, The said LED night light has part-means, which may include an optics-lens, slides, openings, cut-outs, a transparent material piece, a translucent material piece, a telescope assembly, a housing-member, a slide-disc, roller-means, an elastic-member, tilt-means, rotating-means, adjust-means, roller-means, mechanical-means, extend-means, a convex lens, a concave lens, and other elements calculated and designed to make the image, message, logo, characters, sign, time, and data project onto a desired surface such as a top ceiling, opposite walls, floor, or any other desired location and the location of the bigger-size image to be changed when the housing or parts thereof have been moved, tilted, rotated, or spun.

The current invention also may provide a geometric design for the whole night light, which is not limited to the preferred embodiments. An alternative construction for the night light, for example with different tilt, swivel, rotating, bigger-size image-position-change, focus-adjustable means, and/or slide-change features, should still fall within the scope of the current invention.

As shown in FIG. 1, a preferred LED projection night light (1) has prong (1*a*) and inner telescope or tube assembly (1*b*) that fits within a body with a top opening (1*e*) to project the image (1*g*) to a top area and form an image (1*g*) having a certain bigger-size at a certain distance from the opening (1*e*). The project image or patterns (1*g*) night light body has a built-in mechanism or mechanical set (1*f*) for installing a roller or disc or holder (1*c*) with a plurality of slides or optics lens (1*d*) (1D') (1*d"*) so that people can change or rotate optics-lens or slides at any time and project different images on the area (1*g*).

As shown in FIG. 1A, the telescope or tube-assembly (1-1) has a housing-member with a top-end or top area (1-2) having a preferred optics-lens (1-5) and lower-end or lower area (1-3) having an LED. The slide (1-6') fits within the telescope-assembly (1-1) to let LED light beams pass through without leakage out from LED (1-0) to slide (1-6) to top optic lens (1-5). An alternative arrangement (B) has one optional extra optic-lens (1-7) and this optional lens (1-7) functions to cause input narrow LED (1-0) light beams to spread out. however, If light beam already is parallel surface light beams, the extra optic-lens (1-7) are not needed. Or, while the telescope's diameter is smaller than the LED narrow view angle, so this optional optics-lens (1-7) is put between the LED light source and the slide in order to collect all direction the LED light beams become parallel direction light beam and sufficiently to light the whole slide (1-6') surface.

The lens (1-5) and slide (1-6') can have preferred different arrangement or construction or positions for different image requirements. The convex lens of arrangement (B) faces inside to make incoming LED light beams into parallel light beams as they hit the slide (1-6'), so that the lighted tiny image of formed by the slide (1-6') will be very clear and every area will have almost the same brightness without darker or brighter areas. The tube assembly (1-1) may has LED holder (1-9) with optional center hole (1-8) to arrange wire(s).

The current invention has basic project-assembly (1-1) or embodiments which only have
(1) an LED (1-0) on the lower-end or lower-areas of telescope or tube assembly,
(2) an object or image-forming-unit(s) (1-6) (1-6') having a tiny image (e.g., a slide type) that fits within the telescope tube,
(3) an optic-lens (1-5) on the top-end or top-area(s) of the telescope or tube assembly so that LED light beams illuminate the image-forming-unit(s) or object's (1-6) tiny image and the lighted tiny image passes through the top optics-lens (1-5) to magnify it into a bigger-size image and come out from the housing opening end (1*e*).

The basic project assembly (1-1) or project light (1) housing has a construction to install the above (1) LED and (2) slide and (3) optic-lens and a preferred AC or DC power supply to at least one of circuit, switch, sensor or other electric or electronic parts and accessories to make a complete LED projection night light for all purpose including indoor and outdoor powered by AC or DC power.

The one of preferred arrangements of slides (1-6) do not need the optional Optics-lens (1-7) because the LED viewing or emitting angle is smaller than the said inner tube or tube-assembly or telescope tube's diameter so that all LED light beams are emitted into the tube without problems. It will be appreciated that alternative arrangements for the telescope or tube-assembly will still fall within the scope of the current invention. From FIGS. 7, 6, 8, These may utilize the alternative constructions for tube-assembly including top end or top cover (71) and center telescope or tube (70) and receiving-tube (73) and base-tube (75) incorporated with LED (74) and slide/object (70') and project-lens (78) illustrated in FIG. 9A.

From FIGS. 7, 6, 8, The optics lens (78), tube or tube-assembly or telescope (70) and more than one pieces (71+73+75) to form a straight tube or channel, with preferred lens diameter, and/or pre-determined focus designed to get a desired bigger-size image quality and size out of the LED projection night time use light in preferred outside housing shape, construction, applications such as garden light, candle light, time related products has projection image and-or patterns and its own original function including glow light, flicking light, time display, alarm clock.

As shown in FIG. 1B, the roller or disc or holder has a base (1-10) which has certain holes (1-11) (1-11') (1-11") and hole for poles (1-13); The said holes design to hold the plurality slides or film or optic-element(s) in position and also receive incoming LED light beams so the LED light beam hit one of the slides or film or optic-element(s) to project colorful images on the slide or film or optic-element(s) to a desired location at a certain distance. Some applications do need the roller or disc or holder for a plurality of slides s or film or optic-element(s). So long as the slide or film or optic-lens is one of fixed arrangement, there is no need for any roller-or disc or holder to help hold the slide or film or optic-element(s) The current embodiment, however, lets people rotate the roller or disc or holder in order to enable people handle and change slides or film or optic-element(s), or even can change the roller or disc or holder (1-10) from the housing cut-outs or cut-out slot or cut-out opening.

From FIG. 2 illustrates an AC power (2*b*) for plug-in or DC/battery (2*b'*) powered LED time use light (2*e*) such as garden light, candle light, time related product(s) with projection features. At least one LED (2*d*) serves as a light source to supply visible and non-hot light beams. At least one of the inner telescoping or tube assembly (2*m*) incorporates at least or plurality LED or LEDs (2*d*) on a lower-end of lower-tube piece (2*m*), an object or slide(s) or film (not shown), that fits within the telescope or tube assembly top-tube piece (2*m*), and one optics-lens (21) installed between the top end of the telescope or tube assembly and housing openings (2K) so these basic parts create the bigger-image when the LED light passes through the slide (not shown) and top optics-lens (21) or plurality of lens (2*i*) inside disc (2*g*) and comes out from housing opening (2*k*). Other parts may include cut-outs (2*f*) to allow the roller or disc or holder (2g) to rotate, and the night time use products or light (2e) has a housing in geometric shape, construction, application with or without the housing cut-out (2f) (2h) to allow disc or holder or roller or gear set(s) to rotate. The said housing has a circuit and power input system (2b) and trigger system (2c) such as photo sensor or switch within inside or fit base which has transparent or translucent material piece, a translucent material base (2a), and prong (2b) to help make an attractive project image or patterns night time use light that projects a desired image, message, data, logo, or time on a ceiling, opposite walls, floor, or other desired surface. At least one of a power source (2b), circuit (inside of 2a), and trigger (2c) are arranged to work with the LED or LEDs to provide a desired light function, timing, colors, brightness, and/or illumination.

As shown in FIG. 2, the current invention may also use the "interchangeable power source sealed-unit" described in the U.S. patent applications of the inventor that are listed below. The "interchangeable power source sealed unit" contains all electric components including for example a prong, circuit, trigger means, and LED or LED connector, which are sealed within to safely enable an AC power source to turn on and turn off the LEDs. The "interchangeable power source sealed-unit" also can be replaced by a battery-pack which has all electric components within, including batteries, circuit, trigger means, LED or LED connectors, to cause the project image or patterns light to illuminate and exhibit a predetermined function, timing, duration, and/or effects. The "interchangeable power source sealed unit" is described in detail in the following U.S. patent applications, which are herein incorporated by reference:

(1) U.S. patent application Ser. No. 11/527,631 ("LED Night light with interchangeable display unit").
(2) U.S. patent application Ser. No. 11/498,881 ("Poly Night light").
(3) U.S. patent application Ser. No. 11/255,981 ("Multiple light source Night Light").
(4) U.S. patent application Ser. No. 11/094,215 ("LED Night light with Liquid optics medium").

The LED light of this embodiment has preferred outside housing with built-in project assembly and existing function such as LED garden light, LED candle light, LED seasonal light applications, and these night time use products includes a base having an empty inner space arranged to receive a "interchangeable power source sealed unit" or "Prong input power system for AC power products" or "Battery power pack to supply Battery or DC power products" should all fall within the current invention of the type disclosed in the above-listed applications with the above discussed circuit, sensor, switch, timer, IC, prong etc.

The "interchangeable power source sealed-unit" or "Prong input power system for AC power products" or "Battery power pack to supply Battery or DC power products" with its own power, LED, circuit, and attachment kits is arranged so it can fit into any LED light housing, while use interchangeable power source sealed-unit as long as the housing has a uniform compartment. One of preferred product is the "AC powered sealed unit" is arranged to be connected to a 110 Volt 60 Hz or other high voltage connection while meeting all safety standards to make sure that the project image or patterns light does not present any hazard, risk of electrical short circuit, or potential damage by being subjected to multiple testing standards and procedures for related safety certification.

The uniform compartment in the any LED light housing is constructed and has dimensions so it is easy to design the "interchangeable power source sealed-unit" to fit into this compartment. The current invention also provides a "DC battery-pack" which has its own outside dimension similar to that of the "sealed unit" so that it can fit into the "uniform compartment" too. The "DC powered battery-pack" can replace the "AC powered sealed-unit" at any time because both have their own power, LEDs, circuit, and attachment that enable it to fit the same LED light housing as long as there have uniform compartment.

As a result, the LED light of the illustrated embodiment can change its power source from AC to DC or DC to AC. This is a further improvement over the "AC power sealed-unit" above-listed patent applications of the inventor. This is big improvement that not only saves a lot of tooling for different shape LED lights but also saves a lot of safety testing laboratory expense and time. Furthermore, the interchangeable power source also can save a lot of tooling cost and time and labor and still provide a good LED light having a pinhole-imaging function (or other LED lighting fixture, laser LED light device, etc.) with a same nice shape but with different power sources to enable the light to be put in different locations where people stay. This is one of the big features of the current invention. Not only all different shapes of LED project image or patterns light, but also a traditional puck light, can be powered by a DC battery and also by AC as long as people pay for extra parts that let the traditional puck light be plugged into an AC outlet.

However, it will be appreciated that the current invention is not limited to this interchangeable power source model. It can also be an exclusively plug-in model powered by AC Power for less cost or an exclusively DC model powered by batteries, a USB charger, a DC power charger, a DC energy storage device, or a wireless charger to supply the DC current to the said LED project Night light.

As shown in FIG. 2, the AC (2b) or DC (2b') powered LED night time use light (2a) has a base with prongs (2b), sensor (2c), and a preferred circuit inside the base to turn on the LED or LEDs (2d) to supply a light beam that projects an tiny image on the slide(s) (2i') to lighted tiny image (2i') and go through the project-lens(es) (2l) or refractive-lens(es) (2l) or plurality of lens(es) (2i) fit within rotating discs (2g) with plurality of project-lens(es) (2l) to project predetermined size image and-or patterns shown on the front garage door, entrance door, garden fence, garden walls, or top ceiling for a bigger-size image.

The night time use AC (2b) or DC (2b') powered light has a geometric shape outer or top housing having an opening (2K) to allow the at least one of project-assembly's inner telescope (2m) or tube-assembly (2m) which tube-assembly has top and lower tube related to detachable movable disc or holder (2g) and optic-lens (2l) to be installed and project the slide's (not shown) tiny image and magnify it by the top optic-lens (2l) to form a bigger-size colorful image on the ceiling from the top housing opening (2K). The top housing also has a cut-out (2f) (2h) to allow the rotatable slide-disc (2g) to be installed and the slides (not shown) to be changed by rotating the disc (2g) to one of a plurality of the optic-element(s).

FIG. 3 shows one of preferred night time use LED light which maybe a candle light configuration has more details of the construction than the embodiment of FIG. 2. As described above, this embodiment includes a prong (3b) or DC power pack (2b') on the project image or patterns night time use candle shape light (3a) with a top housing (3n) having a top opening (3c) beside the flicking-flame unit to allow at least one of inner telescope or inner tube-assembly (3e) to be installed and the image to be projected through the top optics-lens (3d) to the ceiling. The rotatable slide or optic-lens disc (3g) has a plurality of slides or optic-lens(es) (3k) (3k') (3k") securely installed on the discs (3i)(3i') (3i"), so that rotation of the disc (3g) enables a user to easily change the slide or optic-lens, and project the preferred image or patterns on the ceiling. The top housing (3n) has a cut-out (3f) to allow the rotating slide-disc to be properly installed. The housing (3a) in candle shape has built-in flicking flame-unit (not show) and the housing (3a) may has glow light effects through the preferred opaque or white housing, to make the said night time use candle light with project image and-or patterns function powered by AC (3b) or DC (2b').

FIG. 4 illustrates another embodiment of a plug-in AC (not shown) or battery powered DC (2b') LED project image or patterns night time use illumination light (4a) with projection features. At least one LED (4d) serves as a light source to supply visible light beams.

At least one inner telescope or tube (4c) is incorporated with the LED (4d) or LEDs or slide(s) (4d1), film (4d1), housing top-openings (4e), a transparent material housing piece (here is a ball), a translucent material housing piece (frame and base)[;] to project the desired image, message, data, logo, or time on the top ceiling, opposite walls, floor, house, building, garden fence, garage door, entrance door, or a desired surface.

At least one of the power source (not shown), circuit with or without batteries (4b) and parts (4f) (4g) (4h) (4i), and trigger (not shown) is arranged to work with the LED (4d) or LEDs to provide a desired light function, timing, colors, brightness, and/or illumination. The LED projection image or patterns light without prong (2b) (3b) to directly plug into outlet(s), The LED night time use light preferred to be powered by external transformer, or night time use candle light device (4a) is powered by USB-wire or battery or DC energy storage device (2b'). The night time LED light with project function(s) has a changeable slide, film, angle (for example, if a ball is provided as shown, the ball can rotate), position (again, the ball can rotate), orientation (the ball can rotate, and telescope can pull out and change orientation), light functions, and light effects features.

FIG. 4 shows a basic projection image or patterns night time use light without prong, that is powered by external transformer or DC power for night time use light, in which the LED (4d) light beams hit the object/slide/film (4d1) to illuminate the tiny image of the object/slide/film (4d1) and pass through the top optics-lens (4d2) to magnify the tiny object/slide/film image to a bigger-size image and come out from housing opening (4e). All projection elements fit within the ball shaped housing and the ball housing is installed on the Y-shape frame, which allows the ball to rotate for unlimited circles based on resilient spring contacts (4h) (4h') that supply electricity from the base to the inner LED (4d) electric-poles (4i).

As shown in FIG. 4, the basic one of preferred projection image and-or patterns night time use light (4a) without prong, and it is powered by external transformer or DC batteries (DC).

The image or patterns projection assembly is fit within preferred night time use light or plug-in night time use light (4a) has a power source (DC) and circuit (4b) inside the base (4a), with conductive (4f) (4g) (4h) (4i) to deliver electric signals to the LED (4d) to supply a light of sufficient brightness into the telescope (4c) or tubes' built-in optics-means and its slides (4D1) to allow the slide (4d1) image to be projected to the top through the opening (4e) of the ball housing. The ball housing has a rotatable electric connector (4g) (4h) and (4g') (4h') to allow electric signals to be delivered from the base to inside the ball.

It also offers a rotating property to allow the ball housing to be rotated in order to make the telescope or tube(s) to project the image to a desired location, surface, or areas.

FIG. 5 shows a simple construction. The plug-in AC powered night time use LED light with projection features (5a) of FIG. 5 has a AC power source input from the prong (5b) through the inner circuit (not shown) and conductive means (5f) (5F) to the inner LED (5/1) or LEDs (5/1) in order to supply a super bright light beam to project the slide's (5/2) image to the top or front or desired area. In addition, the embodiment of FIG. 5 utilizes an "interchangeable power source sealed-unit" which contains all electric components including a prong (5b), circuit, trigger means, LED or LED (5/1) connector(s), as described above, in order to obtain power from an AC power source to turn on and turn off the LEDs (5/1). The "interchangeable power source sealed-unit" also can be replaced by a battery-pack which has all electric components within, including batteries, a circuit, trigger means, an LED, and/or LED connectors, to provide night light illumination according to a pre-determined function, timing, duration, and effects.

From FIG. 5 shown the night time use LED light has geometric housing and shape and construction, The light has inner tube has basic project assembly including (1) Tube (5d) and (2) LED (5/1) and (3) slide or image forming unit (5/2) and (4) project lens (5/3) and the lighted image emit out from housing opening (5e) on desired location. And, the light has rotatable features so can change the image shown on anywhere because the housing can have 360 degree rotatable features. From FIG. 5 also show the night time use LED light can be powered by DC power (DC) which has preferred battery with or without built-in LED(S) and built-in circuit to connect with wireless control system at least is one of (1) Wi-Fi, (2) RF or IR remote control system, (3) Zig-be or Z-way wireless system, (4) motion, radar, microwave, photos sensor or sensors system, or (5) switch, conductive switch.

FIG. 5A shows a preferred embodiment (5), including details of mechanical means to allow people to change the slide (5-2) (5-10) by push-button (5-5). The mechanical-means (5-3) (5-4) (5-8) (5-9) (5-11) (5-12) (5-13) enables slides (5-2) (5-10) in a slide or film compartment or disc hole to fit into the center pole (5-3) and some side-poles (FIGS. 5-3, 5-3f and 5-3f') so as to hold the slide or film in position very tightly. The slide or film also has holes (not shown) to connect with the disc hole (5-4) and the top of the disc pole has several equally spaced bars which are pushed by a push-means (5-5) into a certain space to precisely position the next slide at a position that allows the LED light beams to intersect the slide at a correct orientation and project the slide's image to the desired location. The disc hole (5-4) and its poles (5-11) (5-11') are pushed by the push means (5-7) (5-9).

The push-means (5-8) has a very big contact surface to make sure the force been applied to the pole (5-11) so as to move the pole a certain distance to allow a next slide move to a correct position relative to the LED light beam. The push-means (5-9) has more of a catching purpose to make sure the pole (5-11') moves a certain distance and is locked in position. Hence, the push-means (5-8) (5-9) set enables a slide and a next slide to move very precisely into position. A resilient-means (5-16) is situated within the holder (5-18) and the holder has a stopper (5-3) to prevent the resilient-means (5-16) from falling apart and also offer a wall to let the push-button (5-5) move back and forth to change a slide at any time. A press means has two decorative parts (5-1) (5-1') and holding-parts (5-12) (5-12') to hold all other parts in position without falling apart because of the resilient-means (5-16).

FIG. 5B shows another viewing angle for the push-button construction of FIG. 5-1. The push-button (5K) is pushed by the resilient-means (5*i*) to cause the hold-bar (5*j*) to also move down. The resilient-means (5*i*) will hit the stopper-means (5*g*) and return it to its original position after the pushing force is removed from the push-button (5*k*). At the same time, the push-means (5*e*) (5*f*) moves down to push the disc's poles and move the next slide to a correct position. A press-means has decorative parts (5*b*) (5*b'*) and hold parts (5*d*) (5*d'*) to hold all parts tightly in position.

Figure 5D:
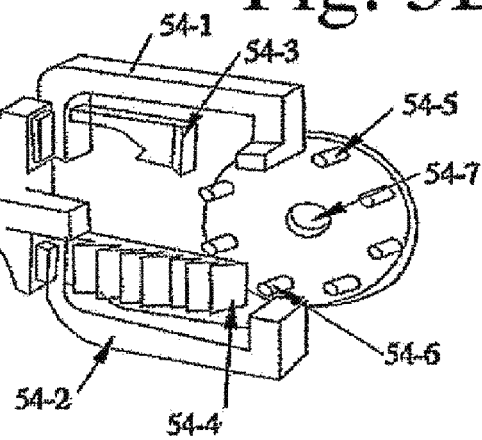

FIG. 5C shows a slide-film (5-3W) having a plurality of slides (5-3*d*) (5-3*d'*) (5-3*d"*) (5-3*d'''*) (5-3*d''''*) (5-3*g*) (5-3*h*) equally spaced on the slide or film disc (5-2*a*). The slide or film disc (5-2*a*) has a plurality of positioning poles (5-3*f*) (5-3*f'*), and a center hole (5-3*i*) to position the pole (5-3*j*). The two sides have another two positioning holes (5-3*e*) (5-3*e'*) to position the poles (5-3*f*) (5-3*f*) and make sure the slide or film disc (5-3*a*) with its plurality of slides is situated at a proper position. ng FIGS. 5D, 5E, 5F, and 5G illustrate further details of the embodiment of FIGS. (5A) (5B) (5C) at different viewing angles and with different details for each part. Details that already been discussed will not be discussed again. However, the larger illustration and drawing may be helpful in further clarifying the details discussed above. It will be appreciated that the current preferred embodiment involves a particular mechanical-means to change slide position, but that all other equivalent or same functions, and/or alternative construction, skills, arrangements, and methods of changing the slide position may still fall within the scope of the current invention.

FIG. 5D is side view of FIGS. 5A, 5B, 5C which has the rotatable disc has plurality pole (54-5) and assembly hole (54-7) and push unit (54-3) and teeth (54-4) fit within the frame (54-1) (54-2) and image output end (54).

Figure 5E:
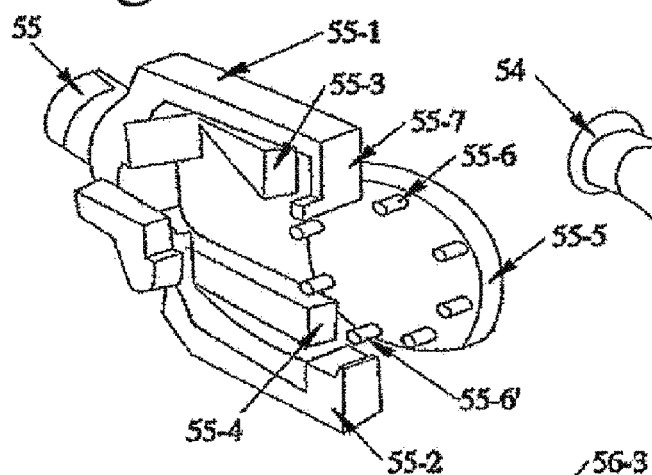

From FIG. 5E, the push system has the rotatable disc (55-5) with plurality pole (55-6) which pushed by bar (55-3) (55-4) fit within the frame (55-7) (55-3) and image output end (55).

Figure 5F:
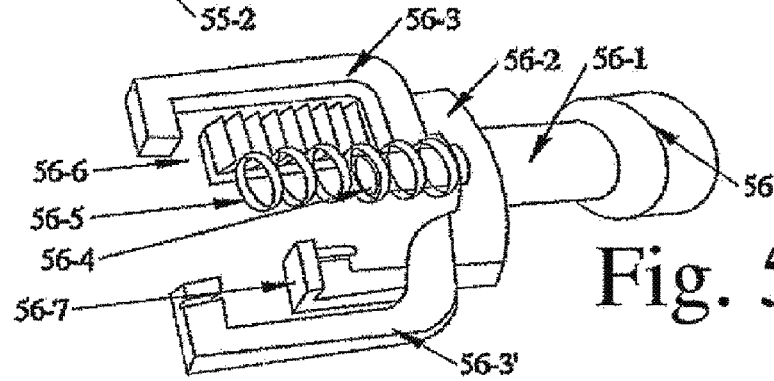

From the FIG. 5F show the other parts details of push system (56-1) which has main housing 56-2) has frame (56-3) (56-3') to install the elastic spring (56-5) which sit on the frame bar (56-4) and push-bar (56-7) and teeth (56-6) to prevent from reverse of the disc.

Figure 5G:
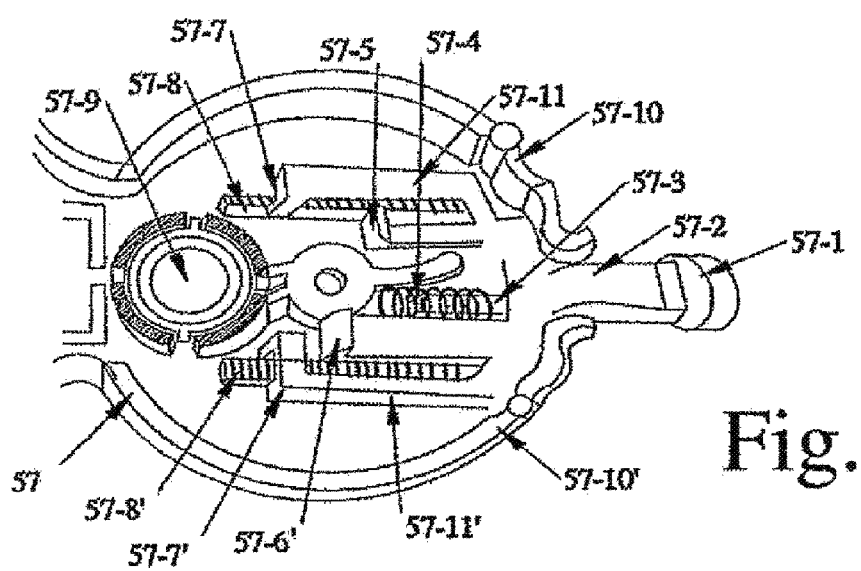

From FIG. 5G for detail to put FIG. 5F including image output tube (57-1) and channel (57-2) and push bar (57-6) and teeth 57-5) (57-8) and hook (57-5) which make movement and push controller bar (57-4) to make the disc (57-9) to change position of one of image-forming-film or slide (not shown). The outside housing has wall (57) (57-10') and curve edge (57-10) to match the other half of the case.

FIG. 6 shows a telescope or tube (60*c*) or inner tube-assembly (tube) (60*c*) and optics-lens assembly (60*d*) inside two half housings. The two halves of the housing are assembled together by screws extending through the poles (60*c"*) (60*c"*) and holders (60*j*) (60*j*). The tube (60*b*) (60*c*) has built-in optics-lens (60*d*) to project image or patterns.

FIG. 7 illustrates details of a telescope assembly of FIG. 6. The project assembly has tube (70) or inner tube-assembly including at least top-end tube (71) and telescope tube (70) and lower-end tube (72) and base tube (73) with a top portion tube (71) having built-in a convex lens or refractive lens (78) inside. The other end (72) of the telescope or inner tube-assembly (70) has a film (70') that are clipped-tight or fit into groove location (79). The LED light (74) light beam to lighted a tiny image on the slide (70') and lighted tiny image pass though the telescope or inner tube-assembly (70) top-end's optics-lens (78) magnify and emit out from the top opening of the housing become a bigger-size image (70). The lower-end tube-assembly (72) is inserted into the receiving end base tube (73), so that an LED light beam can be input to the telescope (72) or inner tube-assembly (70) to make the image project to a desired surface. The LED (74) is installed on an inner circuit-means electric pole(s) (77*a*) (77*b*) (77*c*) and connected with a preferred power source from an outlet or batteries (separate power source or interchangeable power source) to cause the LED to turn on and turn off with a predetermined time, function, predetermined time, function, duration, and effects.

FIG. 8 shows a detailed construction of basic project-assembly has at least one (1) a telescope or tube (87) which has a top cover or top-tube or tube-assembly to hold the convex lens or refractive-lens (84) in position. The other end of inner telescope or tube-assembly (87) has two grooves or cut-out(s) (85) (86) to hold the slide's (83) two extended-ends (85*a*) (86*a*) and thereby hold the slide in position without any deviation. The small optional (not necessary if the LED emit smaller than telescope inner channel or tunnel diameter) convex-lens (84) is clipped-tight on the telescope under or back of the slide (or not used at all in case of a small diameter telescope tube). The image seen from the small end of the telescope is a tiny image (89) but the image seen from the front of the telescope is a very large image (88) because the telescope's top-end optic-lens (81) enlarges the tiny image of object/slide/film (83) to a bigger size.

FIG. 9A shows an alternative inner telescope-assembly or tube-assembly that can also be used to obtain a desired image.

FIG. 9 shows one of the considerations in enabling an AC powered LED night time use light has projection night light for indoor or outdoor applications to project images (I-90) (I-91) on a ceiling or walls (I-90) and outdoor garage door, entrance door, garden wall (I-91) by tilting or moving the housing or optics means to preferred location(s) which the image are away from the night time use light and project a bigger-size image (I-90) to the top-ceiling or front outdoor or indoor location(s).

FIGS. 10-12 illustrate basic optic lens theory, which is applied to the current invention to precisely calculate the optics lens, focus, position of the light source, position of all lenses, position of the slides, and/or telescope length to get a desire image that is as perfect as possible.

Although preferred embodiments of the invention have been described in detail to show the scope of the current invention, it is to be appreciated that any alternative or equivalent functions, or design, construction, modification, and/or up-grade, may still fall within the scope of the invention, which is not limited by the details mentioned in the above discussion. Any alternative or equivalent arrangement, process, installation or the like may still fall within the scope of the current invention, including alternatives to the power source, conductive means, geometric shape of LED-units, joint-means, circuit means, sensor means, switch means, LED elements, attachment means, fixing-means, tightening means, and/or resilient conductive means, which may all have alternative arrangements, design, and construction.

I claim:

1. An LED projection light, comprising:
   more than one LED arranged to emit visible light beams to an image forming element positioned in front of the more than one LED,
   wherein:
   said LED projection light is powered by an AC power source via an external or built-in AC-to-DC circuit that provides DC power for the more than one LED and an integrated circuit (IC),
   said image-forming element is one of a plurality of slides, films, lenses, or shaped holes included in a disc or holder or formed in one piece, and said disc, holder, or piece is fixed or movable in front of the more than one LED to form a desired image, message, data, logo, or time when light beams from the more than one LED pass through the image-forming element,
   said LED light further includes at least one projection lens or cover in front of the image-forming element to project said desired image, message, data, logo, or time onto at least one of an indoor and outdoor surface that is feet away from and outside the LED projection light, said projection lens being installed (a) on a top area of an inner tube, inner tube assembly, or inner housing part, or (b) on an outer housing opening, and
   light beams from the LED light are transmitted through said inner tube, inner tube assembly, or inner housing part travel to and pass through the projection lens or cover for projection to the indoor or outdoor projection surface.

2. An LED projection light as claimed in claim 1, wherein the disc or holder is rotatable.

3. An LED projection light as claimed in claim 2, wherein said image forming element is changed by moving, rotating, or tilting device in response to (a) manual operation, (b) an elastic member, or (c) operation of a push button.

4. An LED projection light as claimed in claim 1, wherein the LED projection light further includes (a) a tilt mechanism, (b) a rotating mechanism, (c) an adjustment mechanism, (d) a swivel mechanism, (e) a moving mechanism, or (f) a bendable member, for changing and/or adjusting an angle, location, and orientation of the projected image, message, data, logo, or time.

5. An LED projection light as claimed in claim 1, further comprising a mechanism for changing a relative position of said at least one image forming element, said more than one LED, and the projection lens to adjust a focus of said image.

6. An LED projection light, comprising:
   at least one LED arranged to emit visible light beams;
   at least one power source;
   a built-in or external AC-to-DC circuit and/or a DC-to-DC circuit, connected to said at least one power source and to circuitry to cause said at least one LED to exhibit a desired light function, timing, color, brightness, and illumination effect;
   an image-forming element positioned in front of the at least one LED to form a desired image, message, data, logo, or time when light beams from the at least one LED pass through the image-forming element,
   said LED projection light further includes at least one projection lens in front of the image-forming element to enlarge and project said desired image, message, data, logo, or time onto a surface at least feet away and outside the LED projection light,
   said LED projection light further includes a telescope, inner housing, or inner tube assembly to arrange the at least one LED, image-forming element, and projection lens,
   wherein:
   said LED projection light is supplied with power from at least one of an AC to DC adaptor, transformer, inverter, and DC power source.

7. An LED projection light as claimed in claim 6, wherein the at least one image forming element includes a plurality of slides, film, lenses, or shaped holes mounted in a rotatable disc or holder.

8. An LED projection light as claimed in claim 6, further comprising a mechanism for enabling a user to change said image, message, data, logo, or time by at least one of a roller or an elastic member.

9. An LED projection light as claimed in claim 6, wherein said at least one image-forming element is changed by moving a roller using an elastic member or in response to pushing of a button.

10. An LED projection light as claimed in claim 6, further comprising an extend and retract mechanism for changing a relative position of said at least one image forming element, said more than one LED, and a projection lens to adjust a focus of said image.

11. An LED projection light, comprising:
    at least one LED arranged to emit visible light beams; and
    at least one power source and circuitry connected to said at least one LED to cause said at least one LED to exhibit a desired light function, timing, color, brightness, and illumination effect:
    wherein:
    said LED projection light is arranged to be connected to at least one of (a) an electrical outlet, (b) an AC to DC adaptor, transformer, or inverter, and (c) a battery or electricity storage device;
    said LED projection light includes an image-forming element in front of the at least one LED to form a desired image, message, data, logo, or time when light beams from the at least one LED pass through the image-forming element or transparent lens,
    said LED projection light further includes a magnifying optics-lens in front of the image-forming element to enlarge and project said desired image, message, data, logo, or time onto a surface outside the LED projection light,
    said LED projection light further includes a telescope, inner housing part, or tube to prevent leakage of light passing from the at least one LED to the image-forming element to the magnifying optics-lens, and
    the at least one image-forming element includes a plurality of objects, slides, films arranged in or on a disc, holder, or compartmented device to enable changing of the objects, slides, or films.

* * * * *